(12) United States Patent
Roberts

(10) Patent No.: US 10,508,744 B2
(45) Date of Patent: Dec. 17, 2019

(54) GATE VALVE WITH FULL-BORE PROTECTIVE SLEEVE

(71) Applicant: Valveworks USA, Inc., Bossier City, LA (US)

(72) Inventor: Todd Roberts, Bossier City, LA (US)

(73) Assignee: VALVEWORKS USA, INC., Bossier City, LA (US)

(*) Notice: Subject to any disclaimer, the term of this patent is extended or adjusted under 35 U.S.C. 154(b) by 6 days.

(21) Appl. No.: 15/396,941

(22) Filed: Jan. 3, 2017

(65) Prior Publication Data

US 2017/0191570 A1 Jul. 6, 2017

Related U.S. Application Data

(60) Provisional application No. 62/274,421, filed on Jan. 4, 2016.

(51) Int. Cl.
*F16K 3/26* (2006.01)
*F16K 3/314* (2006.01)
(Continued)

(52) U.S. Cl.
CPC ............... *F16K 3/26* (2013.01); *E21B 34/02* (2013.01); *F16K 3/0236* (2013.01); *F16K 3/314* (2013.01);
(Continued)

(58) Field of Classification Search
CPC ........ F16K 3/26; F16K 31/523; F16K 27/041; F16K 25/04; F16K 3/314; F16K 3/0236;
(Continued)

(56) References Cited

U.S. PATENT DOCUMENTS 2,356,630 A 8/1944 Strecker
2,520,364 A 8/1950 Hobbs
(Continued)

FOREIGN PATENT DOCUMENTS

CN 201170340 12/2008
GB 669933 4/1952

OTHER PUBLICATIONS

International Search Report and Written Opinion issued by the United States International Search Authority for International application No. PCT/US17/12027 dated May 26, 2017, 31 pages.
(Continued)

*Primary Examiner* — Marina A Tietjen
(74) *Attorney, Agent, or Firm* — Haynes and Boone, LLP

(57) ABSTRACT

A gate valve adapted for use in oil and gas operations, such as, for example, fracturing or gravel-packing operations. In an exemplary embodiment, the gate valve includes a valve body, which defines an internal region; a first fluid bore intersecting the internal region and defining a first interior surface in the valve body; and a first annular recess formed in the first interior surface and adjoining the internal region. A first seat element defines a second fluid bore and extends within the first annular recess. A first protective sleeve extends between respective portions of the first seat element and the valve body. The first and second fluid bores have first and second full-bore inside diameters, respectively. The first protective sleeve has a third full-bore inside diameter that is substantially equal to each of the first and second full-bore inside diameters.

33 Claims, 10 Drawing Sheets

(51) Int. Cl.
*F16K 3/02* (2006.01)
*F16K 39/04* (2006.01)
*F16K 31/50* (2006.01)
*F16K 31/52* (2006.01)
*F16K 27/04* (2006.01)
*F16K 25/04* (2006.01)
*E21B 34/02* (2006.01)
*E21B 43/26* (2006.01)

(52) U.S. Cl.
CPC ............ *F16K 25/04* (2013.01); *F16K 27/041* (2013.01); *F16K 31/508* (2013.01); *F16K 31/523* (2013.01); *F16K 39/04* (2013.01); *E21B 43/26* (2013.01)

(58) Field of Classification Search
CPC ........ F16K 39/04; F16K 31/508; E21B 34/02; E21B 43/26
See application file for complete search history.

(56) References Cited

U.S. PATENT DOCUMENTS

| | | | |
|---|---|---|---|
| 2,796,230 A | 6/1957 | Grove et al. | |
| 3,217,739 A | 11/1965 | La Valley et al. | |
| 4,401,292 A | 8/1983 | Whaley | |
| 4,568,062 A | 2/1986 | Regitz et al. | |
| 4,711,262 A | 12/1987 | Wafer et al. | |
| 4,878,651 A | 11/1989 | Meyer, Jr. | |
| 5,201,872 A | 4/1993 | Dyer | |
| 5,370,362 A | 12/1994 | Kent et al. | |
| 5,445,359 A * | 8/1995 | Beson ............... | F16K 3/205 251/159 |
| 5,624,101 A * | 4/1997 | Beson ............... | F16K 3/20 251/172 |
| 5,727,775 A | 3/1998 | Rodger et al. | |
| 5,762,089 A | 6/1998 | Haeberle et al. | |
| 6,664,572 B2 | 12/2003 | Chatufale | |
| 6,966,537 B2 | 11/2005 | Sundararajan | |
| 7,306,201 B2 | 12/2007 | Lam | |
| 7,481,239 B2 | 1/2009 | McGuire et al. | |
| 7,506,660 B2 | 3/2009 | McGuire et al. | |
| 7,950,410 B2 | 5/2011 | McGuire et al. | |
| 8,327,866 B2 | 12/2012 | Parks, Jr. | |
| 8,662,473 B2 | 3/2014 | Comeaux | |
| 8,672,295 B2 | 3/2014 | Dhawan et al. | |
| 2008/0164437 A1 | 7/2008 | Lam et al. | |
| 2009/0095933 A1 | 4/2009 | McGuire et al. | |
| 2012/0228537 A1 | 9/2012 | Kahn | |
| 2012/0256113 A1 | 10/2012 | Comeaux | |
| 2012/0318528 A1 | 12/2012 | Wolfe | |
| 2015/0014568 A1 * | 1/2015 | Sundararajan ........ | F16K 3/0236 251/328 |
| 2015/0060715 A1 | 3/2015 | Hoang | |

OTHER PUBLICATIONS

International Preliminary Examining Authority, International Preliminary Report on Patentability (IPRP) dated Feb. 12, 2018 in International Application No. PCT/US17/12027, 36 pages.

English-Language Concise Explanation of First Office Action dated Jun. 27, 2019 in Chinese Patent Application No. 201780012680.0, 2 pages.

Chinese-Language First Office Action dated Jun. 27, 2019 in Chinese Patent Application No. 201780012680.0, 18 pages.

English-Language Concise Explanation of First Office Action dated Jun. 27, 2019 in Chinese Patent Application No. 201780012680.0 and Chinese-Language First Office Action dated Jun. 27, 2019 in Chinese Patent Application No. 201780012680.0, 20 pages.

* cited by examiner

GATE VALUE WITH FULL-BORE PROTECTIVE SLEEVE

CROSS-REFERENCE TO RELATED APPLICATION

This application claims priority to, and the benefit of the filing date of, U.S. patent application No. 62/274,421, filed Jan. 4, 2016, the entire disclosure of which is hereby incorporated herein by reference.

TECHNICAL FIELD

The present disclosure relates in general to valves and, in particular, to gate valves used in oil and gas operations.

BACKGROUND

A gate valve may be used in oil and gas operations such as, for example, hydraulic fracturing operations. Fluidic materials may flow through the gate valve at high flow rates and pressures. As a result of being subjected to this type of flow over time, in some cases one or more components of the gate valve, such as sealing elements or other components, may experience structural degradation or failure such as, for example, blowout, wear-out, and/or deterioration. This structural degradation or failure may require the replacement of the entire gate valve. Therefore, what is needed is a gate valve or method that addresses one or more of the foregoing issues, and/or one or more other issues.

DETAILED DESCRIPTION

Figure 1A:
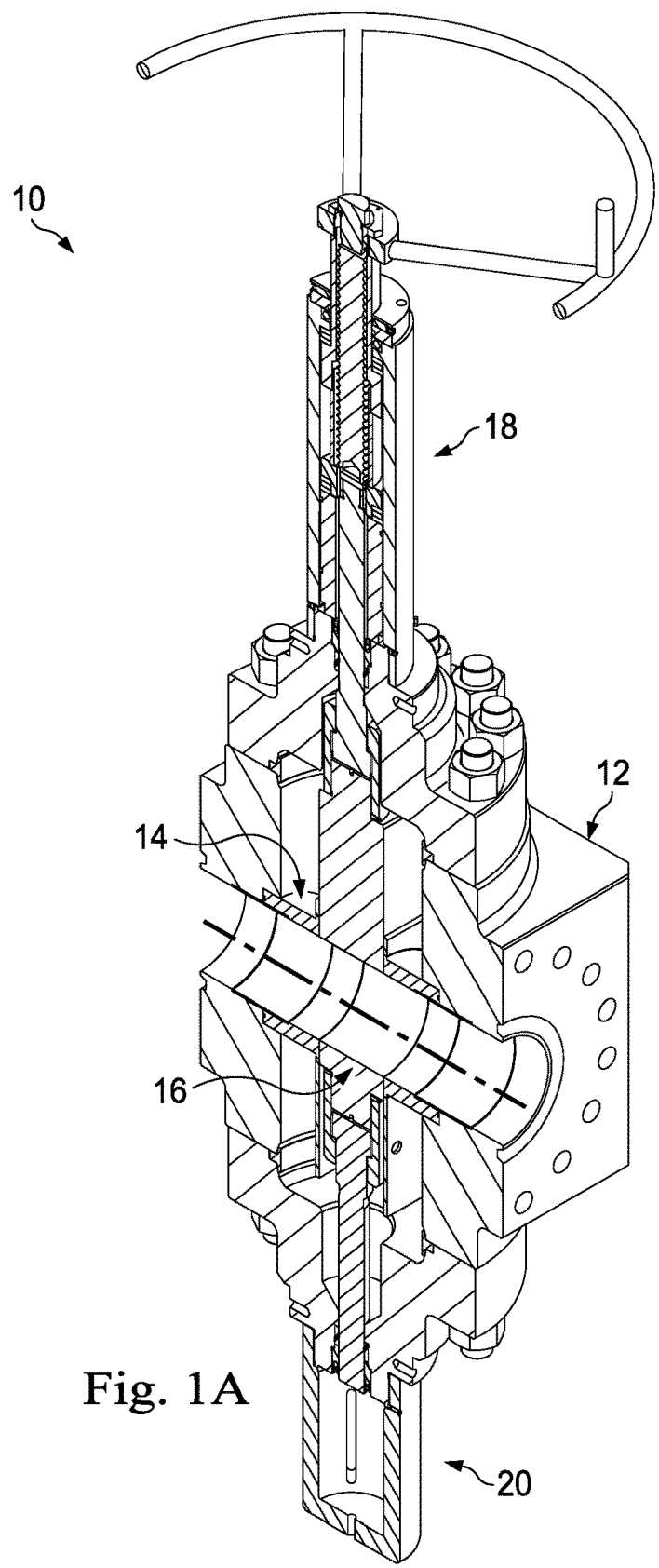
FIG. 1A is a cross-sectional perspective view of a gate valve including a valve body, a valve seat, a gate assembly, an operating end, and a balancing end, according to an exemplary embodiment.
Figure 1B:
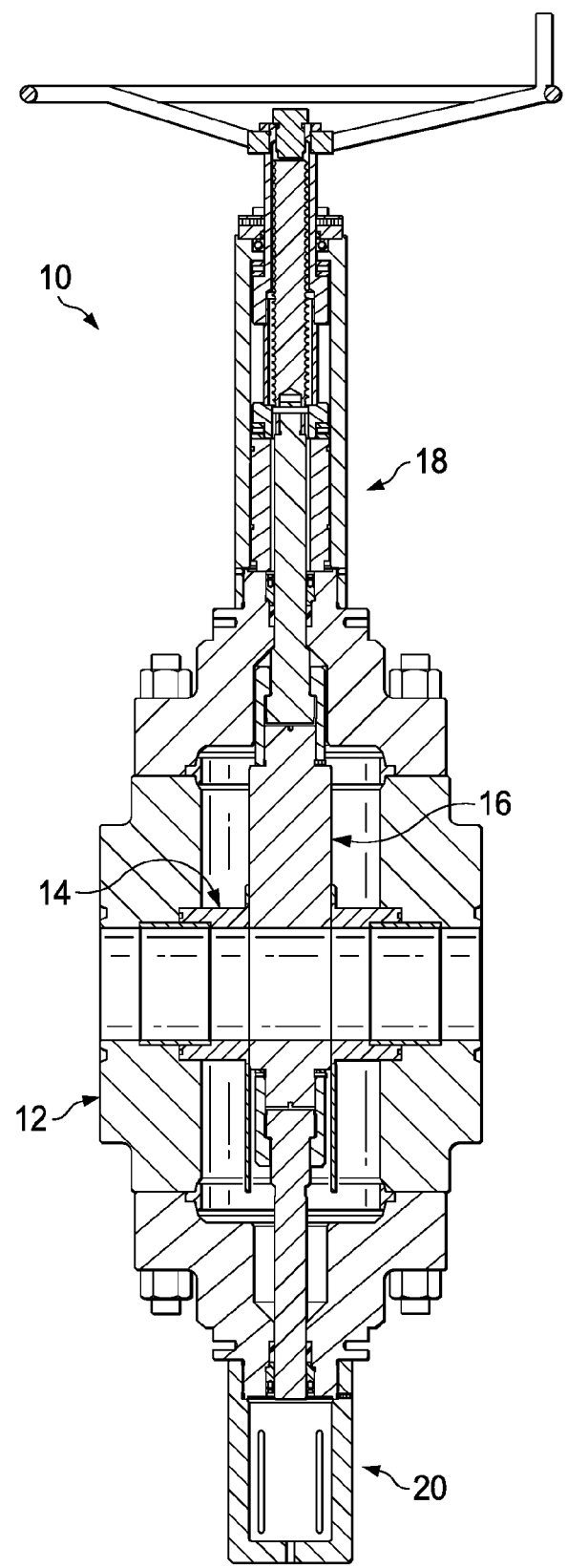
FIG. 1B is a cross-sectional elevational view of the gate valve of FIG. 1A, including the valve body, the valve seat, the gate assembly, the operating end, and the balancing end, according to an exemplary embodiment.

Referring initially to FIGS. 1A and 1B, an exemplary embodiment of a gate valve, generally referred to by the reference numeral 10, is illustrated. The gate valve 10 includes a valve body 12; a valve seat 14 engaged with the valve body 12; a gate assembly 16 extending within the valve body 12 and accommodated by the valve seat 14; an operating end 18 connected to the valve body 12; and a balancing end 20 connected to the valve body 12, opposite the operating end 18. The gate assembly 16 is enclosed within the valve body 12, the operating end 18, and the balancing end 20. The operating end 18 is adapted to actuate the gate assembly 16 between an open configuration, in which a fluid is permitted to flow through the valve body 12, and a closed configuration, in which the fluid is restricted from flowing through the valve body 12. The balancing end 20 accommodates a portion of the gate assembly 16 and balances axial forces such as, for example, hydraulic lift forces, which are exerted on the gate assembly 16 during operation of the gate valve 10. As will be described in further detail below, in an exemplary embodiment, the valve seat 14 includes two sets of identical components positioned on either side of the gate assembly 16, and maintains the axial alignment of the gate assembly 16 during the actuation thereof between the open and closed configurations.

Figure 2:
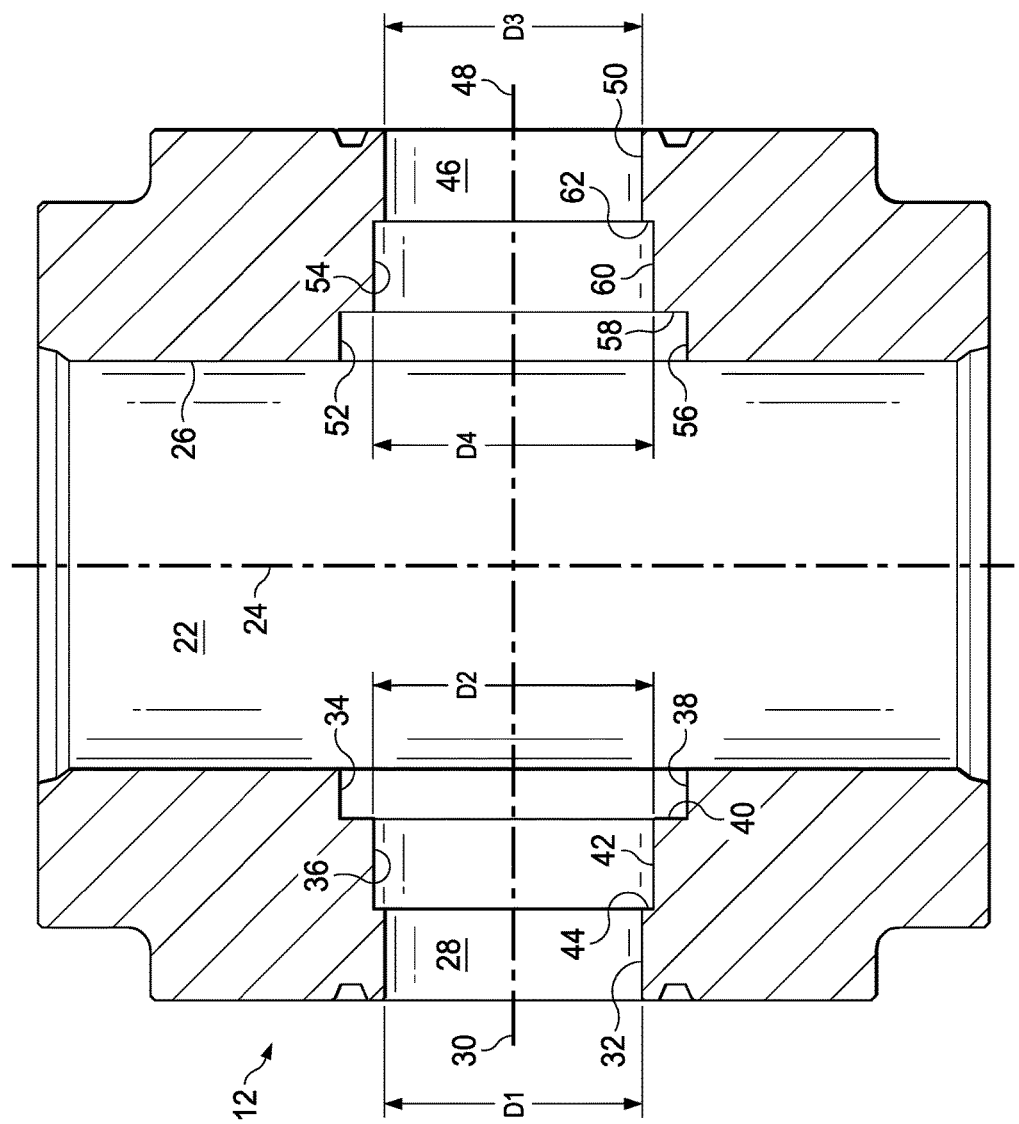
FIG. 2 is a cross-sectional view of the valve body of FIGS. 1A and 1B, according to an exemplary embodiment.

Referring now to FIG. 2, with continuing reference to FIGS. 1A and 1B, an exemplary embodiment of the valve body 12 is illustrated. The valve body 12 includes an internal region 22, such as, for example, a passage or bore, extending therethrough along a longitudinal center axis 24 and defining an interior surface 26 in the valve body 12. A fluid bore 28 extends through the valve body 12 along a longitudinal center axis 30 and intersects the internal region 22. The fluid bore 28 has a full-bore inside diameter D1 and defines an interior surface 32 in the valve body 12. The full-bore inside diameter D1 is a "full-bore inside diameter" because it is unimpeded along the interior surface 32, as shown in FIG. 2. In several exemplary embodiments, the longitudinal center axis 30 of the fluid bore 28 is substantially perpendicular to the longitudinal center axis 24 of the internal region 22.

Annular recesses 34 and 36 are formed in the interior surface 32. The annular recess 34 adjoins the internal region 22 and defines an interior surface 38 and an annular shoulder 40 in the valve body 12. The interior surface 38 adjoins both the annular shoulder 40 and the interior surface 26 of the valve body 12. The annular recess 36 adjoins the annular recess 34. Moreover, the annular recess 36 has an inside diameter D2 that is less than the inside diameter of the annular recess 34. The inside diameter D2 of the annular recess 36 is greater than the full-bore inside diameter D1 of the fluid bore 28. The annular recess 36 defines an interior surface 42 and an annular shoulder 44 in the valve body 12. The annular shoulder 44 adjoins the interior surface 32 of the valve body 12. Further, the interior surface 42 adjoins both the annular shoulder 44 and the annular shoulder 40.

Additionally, a fluid bore 46 extends through the valve body 12 along a longitudinal center axis 48 and intersects the internal region 22. The fluid bore 46 has a full-bore inside diameter D3 and defines an interior surface 50 in the valve body 12. The full-bore inside diameter D3 is a "full-bore inside diameter" because it is unimpeded along the interior surface 50, as shown in FIG. 2. In several exemplary embodiments, the longitudinal center axis 48 of the fluid bore 46 is substantially perpendicular to the longitudinal center axis 24 of the internal region 22. Moreover, in several exemplary embodiments and as shown in FIG. 2, the longitudinal center axes 30 and 48 of the inlet and fluid bores 28 and 46, respectively, are substantially co-axial.

Annular recesses 52 and 54 are formed in the interior surface 50. The annular recess 52 adjoins the internal region 22 and defines an interior surface 56 and an annular shoulder 58 in the valve body 12. The interior surface 56 adjoins both the annular shoulder 58 and the interior surface 26 of the valve body 12. The annular recess 54 adjoins the annular recess 52. Moreover, the annular recess 54 has an inside diameter D4 that is less than the inside diameter of the annular recess 52. The inside diameter D4 of the annular recess 54 is greater than the full-bore inside diameter D3 of the fluid bore 46. The annular recess 54 defines an interior surface 60 and an annular shoulder 62 in the valve body 12. The annular shoulder 62 adjoins the interior surface 50 of the valve body 12. Further, the interior surface 60 adjoins both the annular shoulder 62 and the annular shoulder 58. In several exemplary embodiments, the full-bore inside diameter D1 is equal to the full-bore inside diameter D3. In several exemplary embodiments, the inside diameter D2 is equal to the inside diameter D4. In several exemplary embodiments, the inside diameters D1 and D2 are equal to the inside diameters D3 and D4, respectively.

Figure 3:
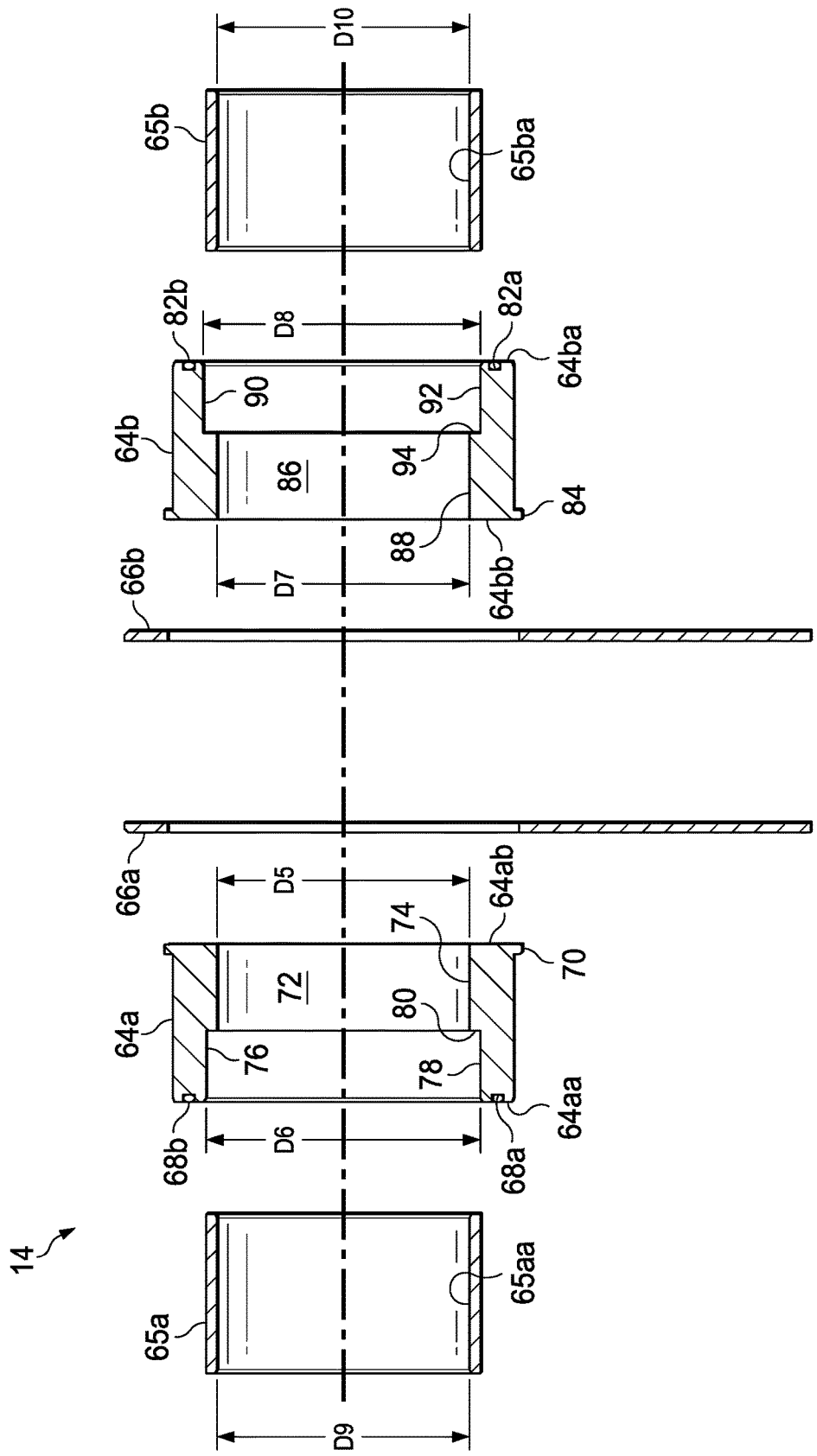
FIG. 3 is a cross-sectional exploded view of the valve seat of FIGS. 1A and 1B, according to an exemplary embodiment.

Referring to FIG. 3, with continuing reference to FIGS. 1A and 1B, an exemplary embodiment of the valve seat 14 is illustrated. The valve seat 14 includes a pair of seat elements 64a and 64b, a corresponding pair of protective sleeves 65a and 65b, and a corresponding pair of gate guides 66a and 66b, respectively. The seat element 64a is a generally cylindrical member defining a pair of opposing faces 64aa and 64ab. Similarly, the seat element 64b is a generally cylindrical member defining a pair of opposing faces 64ba and 64bb. In several exemplary embodiments, the seat elements 64a and 64b are substantially identical to one another.

The seat element 64a includes an annular groove 68a formed in the face 64aa thereof. The annular groove 68a is adapted to accommodate an annular seal 68b. Further, an annular ridge 70 extends radially outward from the exterior of the seat element 64a. In several exemplary embodiments, the face 64ab is at least partially defined by the annular ridge 70. Further still, a fluid bore 72 having a full-bore inside diameter D5 extends longitudinally through the seat element 64a, including the opposing faces 64aa and 64ab, thus defining an interior surface 74 in the seat element 64a. Finally, an annular recess 76 having an inside diameter D6 is formed in the interior surface 74. The inside diameter D6 is greater than the full-bore inside diameter D5. The full-bore inside diameter D5 is a "full-bore inside diameter" because it is unimpeded along the interior surface 74, as shown in FIG. 3. The annular recess 76 defines an interior surface 78 and an annular shoulder 80 in the seat element 64a. The annular shoulder 80 adjoins the interior surface 74 of the seat element 64a. Moreover, the interior surface 78 adjoins both the annular shoulder 80 and the face 64aa of the seat element 64a. The face 64aa of the seat element 64a is adapted to abut, or nearly abut, the annular shoulder 40 in the valve body 12 when the seat element 64a is installed in the valve body 12, as will be discussed in further detail below.

The seat element 64b includes an annular groove 82a formed in the face 64ba thereof. The annular groove 82a is adapted to accommodate an annular seal 82b. Further, an annular ridge 84 extends radially outward from the exterior of the seat element 64b. In several exemplary embodiments, the face 64bb is at least partially defined by the annular ridge 84. Further still, a fluid bore 86 having a full-bore inside diameter D7 extends longitudinally through the seat element 64b, including the opposing faces 64ba and 64bb, thus defining an interior surface 88 in the seat element 64b. Finally, an annular recess 90 having an inside diameter D8 is formed in the interior surface 88. The inside diameter D8 is greater than the full-bore inside diameter D7. The full-bore inside diameter D7 is a "full-bore inside diameter" because it is unimpeded along the interior surface 88, as shown in FIG. 3. The annular recess 90 defines an interior surface 92 and an annular shoulder 94 in the seat element 64b. The annular shoulder 94 adjoins the interior surface 88 of the seat element 64b. Moreover, the interior surface 92 adjoins both the annular shoulder 94 and the face 64ba of the seat element 64b. The face 64ba of the seat element 64b is adapted to abut, or nearly abut, the annular shoulder 58 in the valve body 12 when the seat element 64b is installed in the valve body 12, as will be discussed in further detail below. In several exemplary embodiments, the full-bore inside diameters D5 and D7 are equal. In several exemplary embodiments, the inside diameters D6 and D8 are equal. In several exemplary embodiments, the inside diameters D5 and D6 are equal to the inside diameters D7 and D8, respectively.

The protective sleeves 65a and 65b are generally cylindrical tubes adapted to protect the annular seals 68b and 82b, from blowout, wear-out, and/or deterioration, as will be discussed in further detail below. In several exemplary embodiments, the protective sleeves 65a and 65b are substantially identical to one another.

When the seat element 64a is installed in the valve body 12, the protective sleeve 65a is adapted to extend within the respective annular recesses 36 and 76 of the valve body 12 and the seat element 64a. The protective sleeve 65a extends between respective portions of the valve body 12 and the seat element 64a, that is, between the annular shoulder 44 and the annular shoulder 80. As a result, in several exemplary embodiments, an interior surface 65aa of the protective sleeve 65a is adapted to be substantially aligned, or substantially flush, with the respective interior surfaces 32 and 74 of the valve body 12 and the seat element 64a. Moreover, the protective sleeve 65a has a full-bore inside diameter D9. The full-bore inside diameter D9 is a "full-bore inside diameter" because it is unimpeded along the interior surface 65aa, as shown in FIG. 3. In several exemplary embodiments, the full-bore inside diameter D9 is equal to the full-bore inside diameter D1 of the fluid bore 28.

Similarly, when the seat element 64b is installed in the valve body 12, the protective sleeve 65b is adapted to extend within the respective annular recesses 54 and 90 of the valve body 12 and the seat element 64b. The protective sleeve 65b extends between respective portions of the valve body 12 and the seat element 64b, that is, between the annular shoulder 62 and the annular shoulder 94. As a result, in several exemplary embodiments, an interior surface 65ba of the protective sleeve 65b is adapted to be substantially aligned, or substantially flush, with the respective interior surfaces 50 and 88 of the valve body 12 and the seat element 64b. Moreover, the protective sleeve 65b has a full-bore inside diameter D10. The full-bore inside diameter D10 is a "full-bore inside diameter" because it is unimpeded along the interior surface 65ba, as shown in FIG. 3. In several exemplary embodiments, the full-bore inside diameter D10 is equal to the full-bore inside diameter D3 of the fluid bore 46. In several exemplary embodiments, the full-bore inside diameters D9 and D10 are equal.

In several exemplary embodiments, each of the protective sleeves 65a and 65b is composed of hardenable steel. In several exemplary embodiments, each of the protective sleeves 65a and 65b is composed of a 4000 Series Steel. In several exemplary embodiments, each of the protective sleeves 65a and 65b is composed of 8620 Steel. In several exemplary embodiments, each of the protective sleeves 65a and 65b is composed of carburized steel.

The gate guide 66a is adapted to circumscribe the exterior of the seat element 64a and to be supported, for example, in a substantially parallel relation to the gate guide 66b. In several exemplary embodiments, the gate guide 66a is adapted to circumscribe the annular ridge 70 of the seat element 64a. In several exemplary embodiments, when the gate guide 66a circumscribes the seat element 64a, at least a portion of the gate guide 66a is substantially co-planar with the face 64ab of the seat element 64a.

The gate guide 66b is adapted to circumscribe the exterior of the seat element 64b and to be supported, for example, in a substantially parallel relation to the gate guide 66a. In several exemplary embodiments, the gate guide 66b is adapted to circumscribe the annular ridge 84 of the seat element 64b. In several exemplary embodiments, when the gate guide 66b circumscribes the seat element 64b, at least a portion of the gate guide 66b is substantially co-planar with the face 64bb of the seat element 64a.

In several exemplary embodiments, the gate guides 66a and 66b are substantially identical to one another. In several exemplary embodiments, the gate guides 66a and 66b are connected to one another. In several exemplary embodiments, the gate guides 66a and 66b are integrally formed. In several exemplary embodiments, the gate guides 66a and 66b together define a tubular member.

Figure 4:
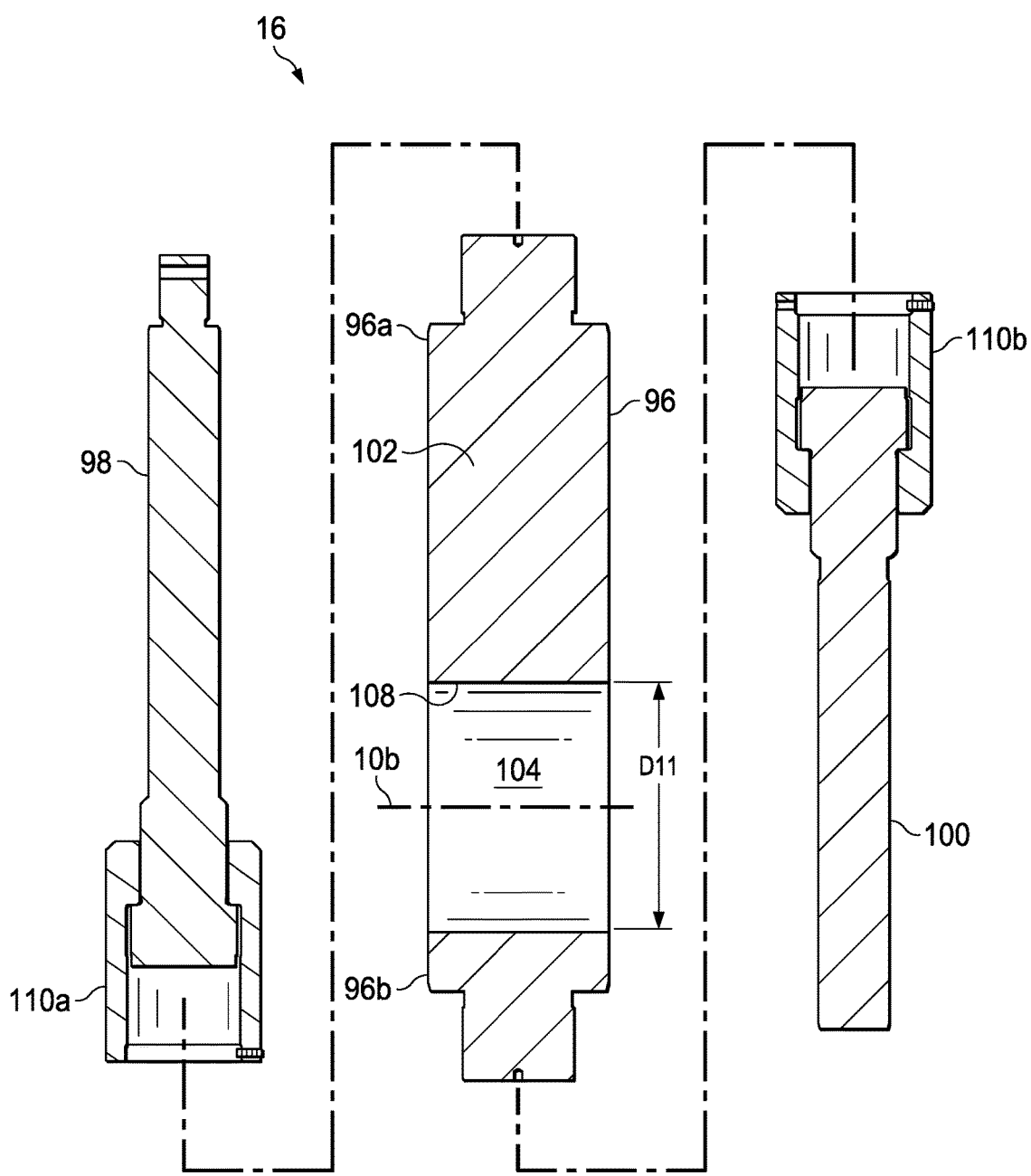
FIG. 4 is a cross-sectional view of the gate assembly of FIGS. 1A and 1B, according to an exemplary embodiment.

Referring to FIG. 4, with continuing reference to FIGS. 1A and 1B, an exemplary embodiment of the gate assembly 16 is illustrated. The gate assembly 16 includes a gate, such as, for example, a slab 96; an operating stem 98 adapted to be connected to the slab 96; and a balance stem 100 adapted to be connected to the slab 96 opposite the operating stem 98. The slab 96 defines opposing end portions 96a and 96b. A block portion 102 is defined in the end portion 96a of the slab 96. In several exemplary embodiments, the block portion 102 forms a solid mass that is free of any holes, gaps, cavities, openings, apertures, voids, or the like. In contrast, a fluid bore 104 extends through the end portion 96b of the slab 96 along a longitudinal center axis 106. The fluid bore 104 has a full-bore inside diameter D11 and defines an interior surface 108 in the slab 96. The full-bore inside diameter D11 is a "full-bore inside diameter" because it is unimpeded along the interior surface 108, as shown in FIG. 4. When the valve seat 14 and the gate assembly 16 are installed in the valve body 12, the slab 96 is adapted to be constrained on one side by the seat element 64a and the gate guide 66a and, on the other side, by the seat element 64b and the gate guide 66b. Constrained as such, the slab 96 is adapted to move axially between the open configuration and the closed configuration, as will be described in further detail below.

The operating stem 98 and the balance stem 100 are connected to the end portions 96a and 96b, respectively, of the slab 96, via a pair of gate nuts 110a and 110b, respectively. In several exemplary embodiments, when the operating stem 98 and the balance stem 100 are connected to the slab 96, the operating stem 98 and the balance stem 100 are adapted to be substantially co-axial. Moreover, in several exemplary embodiments, the operating stem 98 and the balance stem 100 are adapted to be substantially co-axial with the longitudinal center axis 24 of the valve body 12 when the gate assembly 16 is installed in the valve body 12.

Figure 5:
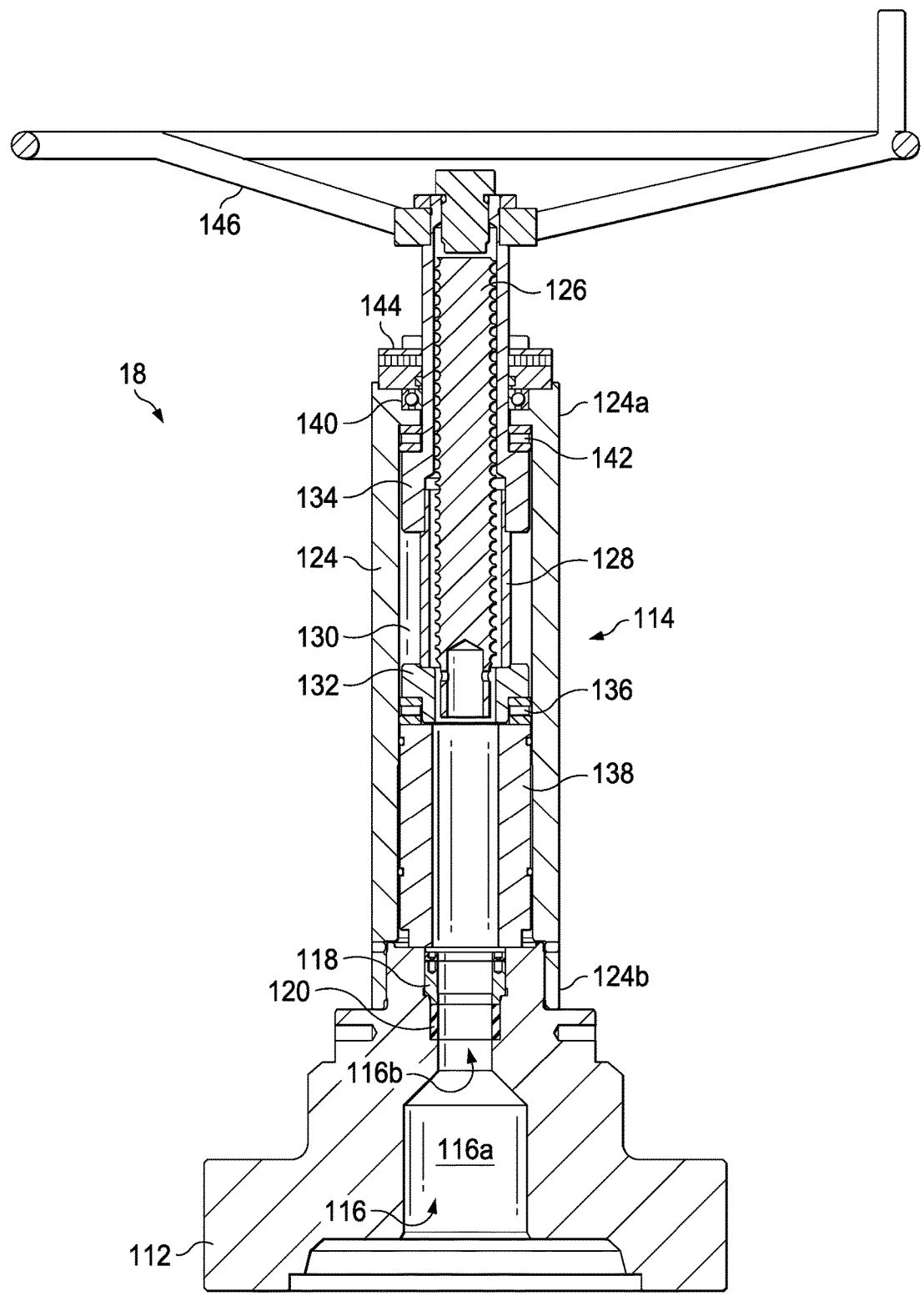
FIG. 5 is a cross-sectional view of the operating end of FIGS. 1A and 1B, according to an exemplary embodiment.

Referring to FIG. 5, with continuing reference to FIGS. 1A and 1B, an exemplary embodiment of the operating end 18 is illustrated. The operating end 18 includes a bonnet 112 and a linear actuator such as, for example, a ballscrew assembly 114 connected to the bonnet 112. The bonnet 112 is adapted to be connected to the valve body 12 via, for example, a plurality of fasteners 122 (shown in FIG. 7). An internal passage 116 extends longitudinally through the bonnet 112. The internal passage 116 defines an enlarged inside diameter portion 116a and a reduced inside diameter portion 116b. In several exemplary embodiments, the internal passage 116 of the bonnet 112 is adapted to be substantially co-axial with the longitudinal center axis 24 of the valve body 12 when the bonnet 112 is connected to the valve body 12.

The enlarged inside diameter portion 116a of the internal passage 116 is adapted to accommodate the gate nut 110a of the operating stem 98 when the gate assembly 16 is in the open configuration. A seal gland 118 is defined in the reduced inside diameter portion 116b of the internal passage 116. The seal gland 118 accommodates a packing element 120, which packing element, in turn, is adapted to provide both a static and a dynamic seal between the bonnet 112 and the operating stem 98 of the gate assembly 16. A balancing port (not shown) may be formed through the bonnet 112 into the internal passage 116. During operation, as will be discussed in further detail below, the balancing port may be placed in communication with the fluid exiting the fluid bore 46 of the gate valve 10. Such fluid communication facilitates the balancing of axial forces such as, for example, hydraulic lift forces, which are exerted on the gate assembly 16.

The ballscrew assembly 114 includes a ballscrew housing 124, a ballscrew 126 extending within the ballscrew housing 124, and a ballscrew nut 128 that threadably engages the ballscrew 126. The ballscrew housing 124 defines opposing end portions 124a and 124b. The end portion 124b of the ballscrew housing 124 is connected to the bonnet 112. An internal passage 130 extends longitudinally through the ballscrew housing 124. In several exemplary embodiments, when the operating end 18 is connected to the valve body 12, the internal passage 130 is substantially co-axial with the longitudinal center axis 24 of the valve body 12.

The ballscrew nut 128 is held at opposite ends by an upper bearing spacer 132 and an adapter stem 134. The upper bearing spacer 132 is supported within the ballscrew housing 124 by a lower thrust bearing 136 and a lower bearing spacer 138, which together permit the upper bearing spacer 132 to rotate within the ballscrew housing 124. Similarly, the adapter stem 134 is supported within the ballscrew housing 124 by a radial bearing 140 and an outer thrust bearing 142, which together permit the adapter stem 134 to rotate within the ballscrew housing 124. Accordingly, the adapter stem 134, the ballscrew nut 128, and the upper bearing spacer 132 are together capable of rotating within the ballscrew housing 124 and relative to the ballscrew 126. A cover plate 144 is connected at the end portion 124a of the ballscrew housing 124 to accommodate a portion of the adapter stem 134. A handle 146 is connected to a portion of the adapter stem 134 extending outside the ballscrew housing 124.

The handle 146 is adapted to rotate the adapter stem 134, the ballscrew nut 128, and the upper bearing spacer 132 in relation to the ballscrew 126, thus displacing the ballscrew 126 axially in relation to the ballscrew nut 128. Moreover, when the bonnet 112 is connected to the valve body 12, the ballscrew 126 is adapted to be connected to the operating stem 98 of the gate assembly 16 so that any axial displacement of the ballscrew 126 is transmitted to the operating stem 98. As a result, rotation of the handle 146 actuates the gate assembly 16 between the open configuration and the closed configuration, as will be discussed in further detail below.

Figure 6:
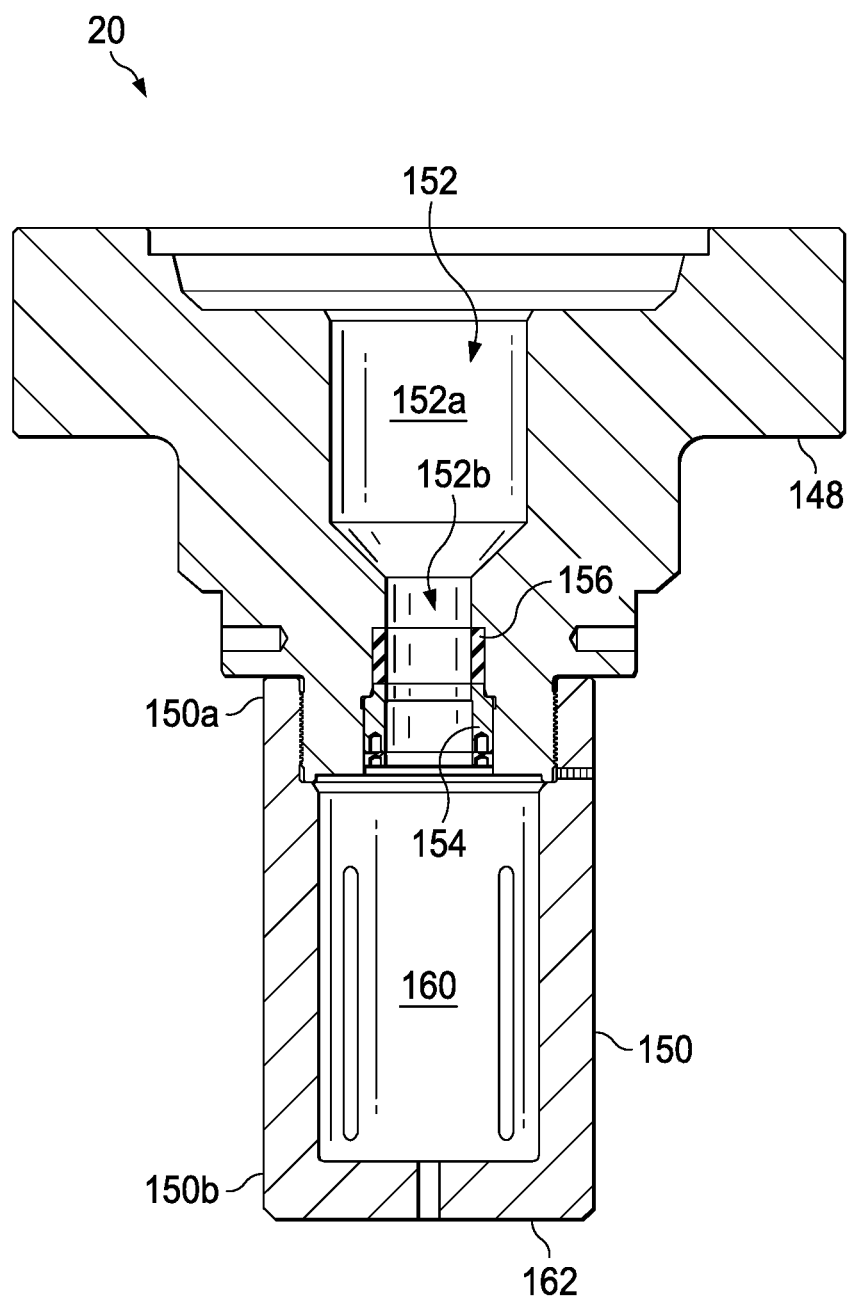
FIG. 6 is a cross-sectional view of the balancing end of FIGS. 1A and 1B, according to an exemplary embodiment.

Referring to FIG. 6, with continuing reference to FIGS. 1A and 1B, an exemplary embodiment of the balancing end 20 is illustrated. The balancing end 20 includes a bonnet 148 and a stem protector 150 connected to the bonnet 148. The bonnet 148 is adapted to be connected to the valve body 12, opposite the bonnet 112, via, for example, a plurality of fasteners 158 (shown in FIG. 7). An internal passage 152 extends longitudinally through the bonnet 148. The internal passage 152 defines an enlarged inside diameter portion 152a and a reduced inside diameter portion 152b. In several exemplary embodiments, the internal passage 152 of the bonnet 148 is adapted to be substantially co-axial with the longitudinal center axis 24 of the valve body 12 when the bonnet 148 is connected to the valve body 12.

The enlarged inside diameter portion 152a of the internal passage 152 is adapted to accommodate the gate nut 110b of the balance stem 100 when the gate assembly 16 is in the closed configuration. A seal gland 154 is defined in the reduced inside diameter portion 152b of the internal passage 152. The seal gland 154 accommodates a packing element 156, which packing element, in turn, is adapted to provide both a static and a dynamic seal between the bonnet 148 and the balance stem 100 of the gate assembly 16. A balancing port (not shown) may be formed through the bonnet 148 into the internal passage 152. During operation, as will be discussed in further detail below, the balancing port may be placed in communication with the fluid exiting the fluid bore 46 of the gate valve 10. Such fluid communication facilitates the balancing of axial forces such as, for example, hydraulic lift, exerted on the gate assembly 16.

The stem protector 150 defines opposing end portions 150a and 150b. The end portion 150a of the stem protector 150 is connected to the bonnet 148. An internal cavity 160 is defined in the stem protector 150 and is adapted to accommodate the balance stem 100 when the gate assembly 16 is in the closed configuration. In several exemplary embodiments, when the balancing end 20 is connected to the valve body 12, the internal cavity 160 is substantially co-axial with the longitudinal center axis 24 of the valve body 12. An end cap 162 is formed at the end portion 150b of the stem protector 150.

Figure 7:
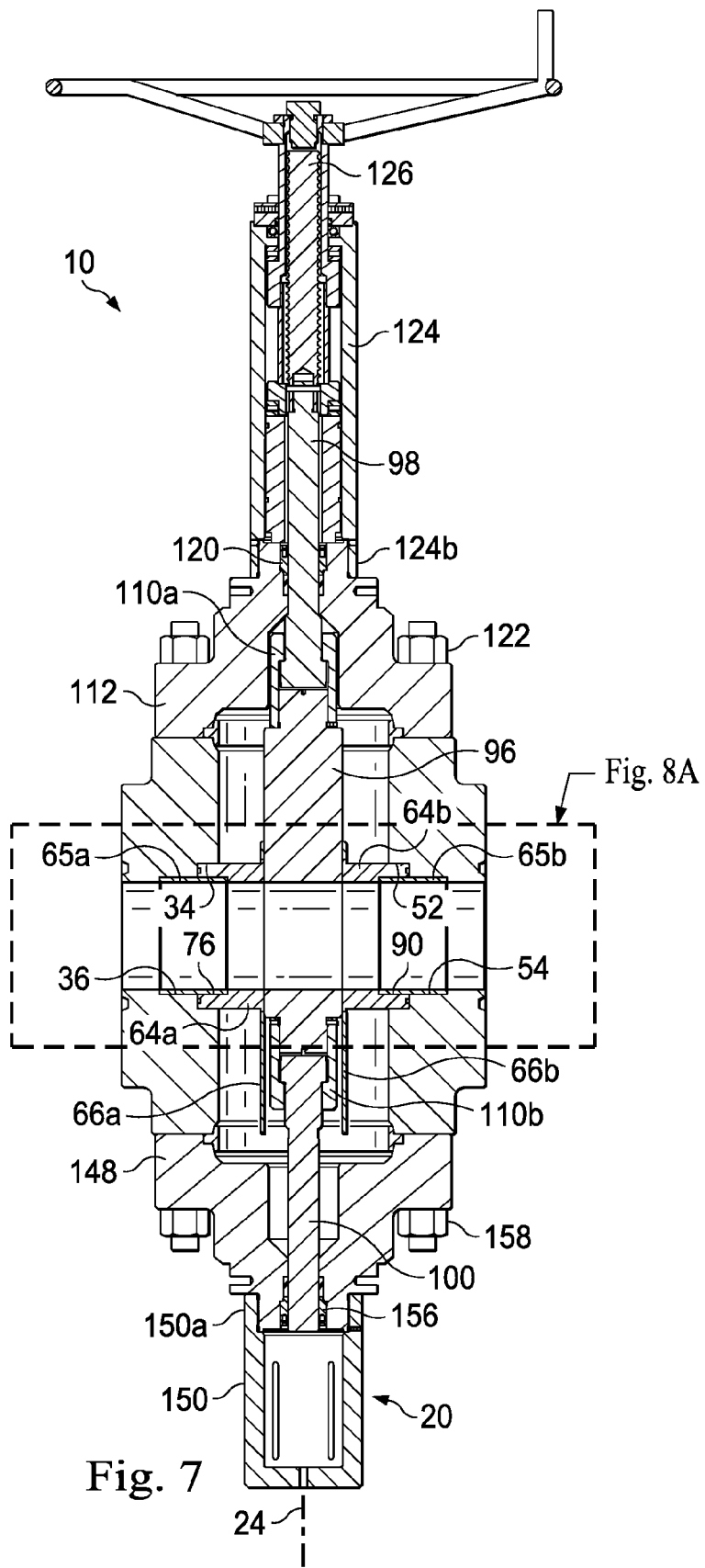
FIG. 7 is a cross-sectional view of the gate valve of FIGS. 1A-6 in an open configuration, the gate valve including the valve body, the valve seat, the gate assembly, the operating end, and the fluid end, according to an exemplary embodiment.

Referring to FIG. 7, the gate valve 10 is illustrated in an assembled condition, including the valve body 12, the valve seat 14, the gate assembly 16, the operating end 18, and the balancing end 20.

In the assembled condition, the seat elements 64a and 64b of the valve seat 14 extend within the respective annular recesses 34 and 52 of the valve body 12. As a result, the protective sleeve 65a extends within the respective annular recesses 36 and 76 of the valve body 12 and the seat element 64a. Moreover, the protective sleeve 65b extends within the respective annular recesses 54 and 90 of the valve body 12 and the seat element 64b. In this position, the gate guides 66a and 66b are supported by the seat elements 64a and 64b in, for example, a substantially parallel relation.

Further, the slab 96 is constrained on one side by the seat element 64a and the gate guide 66a and, on the other side, by the seat element 64b and the gate guide 66b. In this position, the slab 96 is adapted to move axially between the open and closed configurations. The operating stem 98 and the balance stem 100 are connected to the slab 96 via the gate nuts 110a and 110b, respectively. In several exemplary embodiments, the operating stem 98 and the balance stem 100 are substantially co-axial with the longitudinal center axis 24 of the valve body 12.

Further still, the bonnet 112 is connected to the valve body 12 via, for example, the plurality of fasteners 122. The end portion 124b of the ballscrew housing 124 is connected to the bonnet 112. In several exemplary embodiments, the internal passage 116 of the bonnet 112 and the internal passage 130 of the ballscrew housing 124 are substantially co-axial with the longitudinal center axis 24 of the valve body 12. The operating stem 98 of the gate assembly 16 extends within the internal passage 116 of the bonnet 112 so that the packing element 120 provides static and dynamic sealing between the bonnet 112 and the operating stem 98. Moreover, the operating stem 98 is connected to the ballscrew 126 so that any rotation of the ballscrew nut 128 axially displaces both the ballscrew 126 and the operating stem 98.

Finally, the bonnet 148 is connected to the valve body 12, opposite the bonnet 112, via, for example, the plurality of fasteners 158. The end portion 150a of the stem protector 150 is connected to the bonnet 148. In several exemplary embodiments, the internal passage 152 of the bonnet 148 and the internal cavity 160 of the stem protector 150 are substantially co-axial with the longitudinal center axis 24 of the valve body 12. The balance stem 100 of the gate assembly 16 extends within the internal passage 152 of the bonnet 148 so that the packing element 156 provides static and dynamic sealing between the bonnet 148 and the balance stem 100.

Figure 8A:
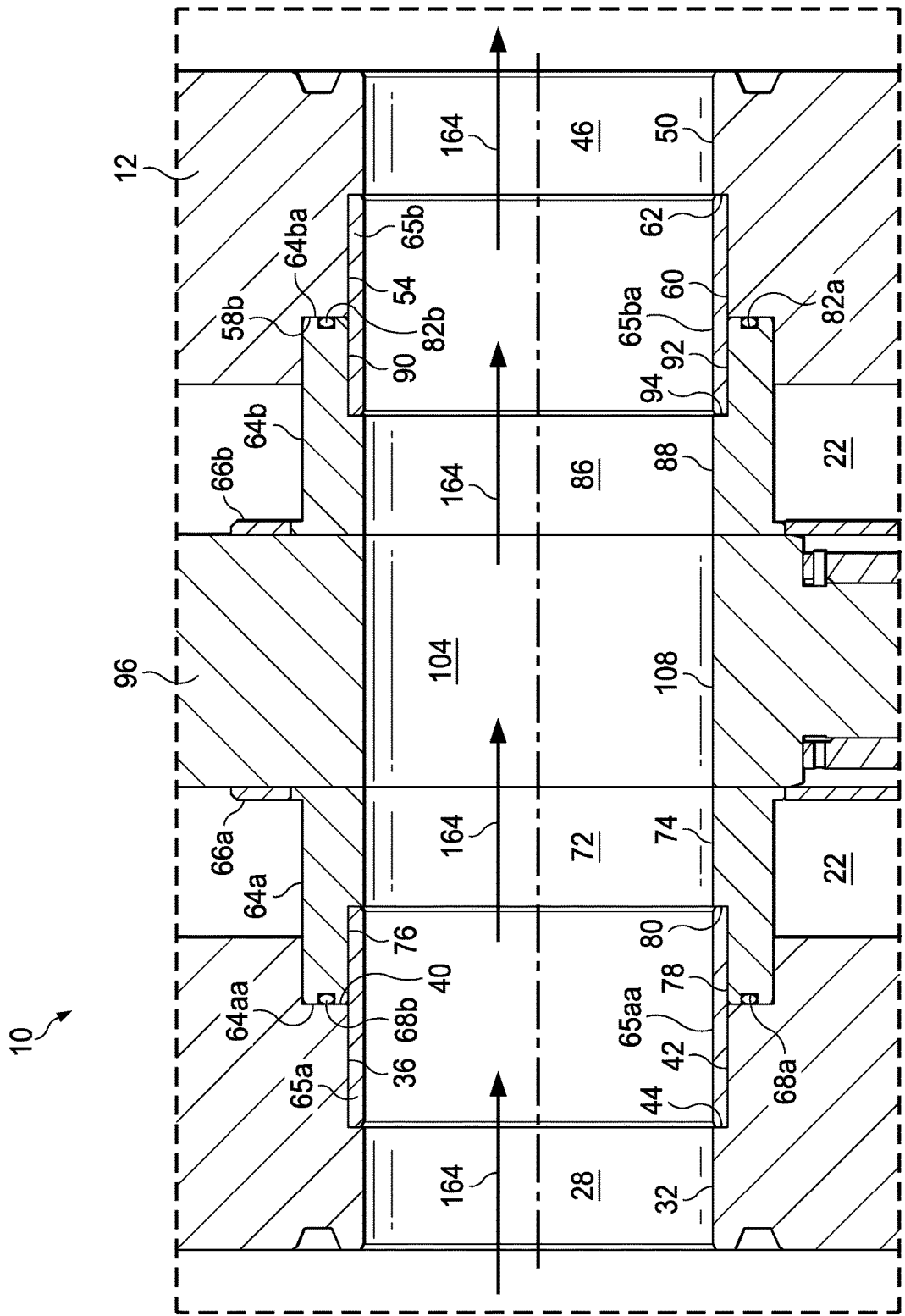
FIG. 8A is an enlarged view of a portion of the cross-sectional view of FIG. 7, according to an exemplary embodiment.
Figure 8B:
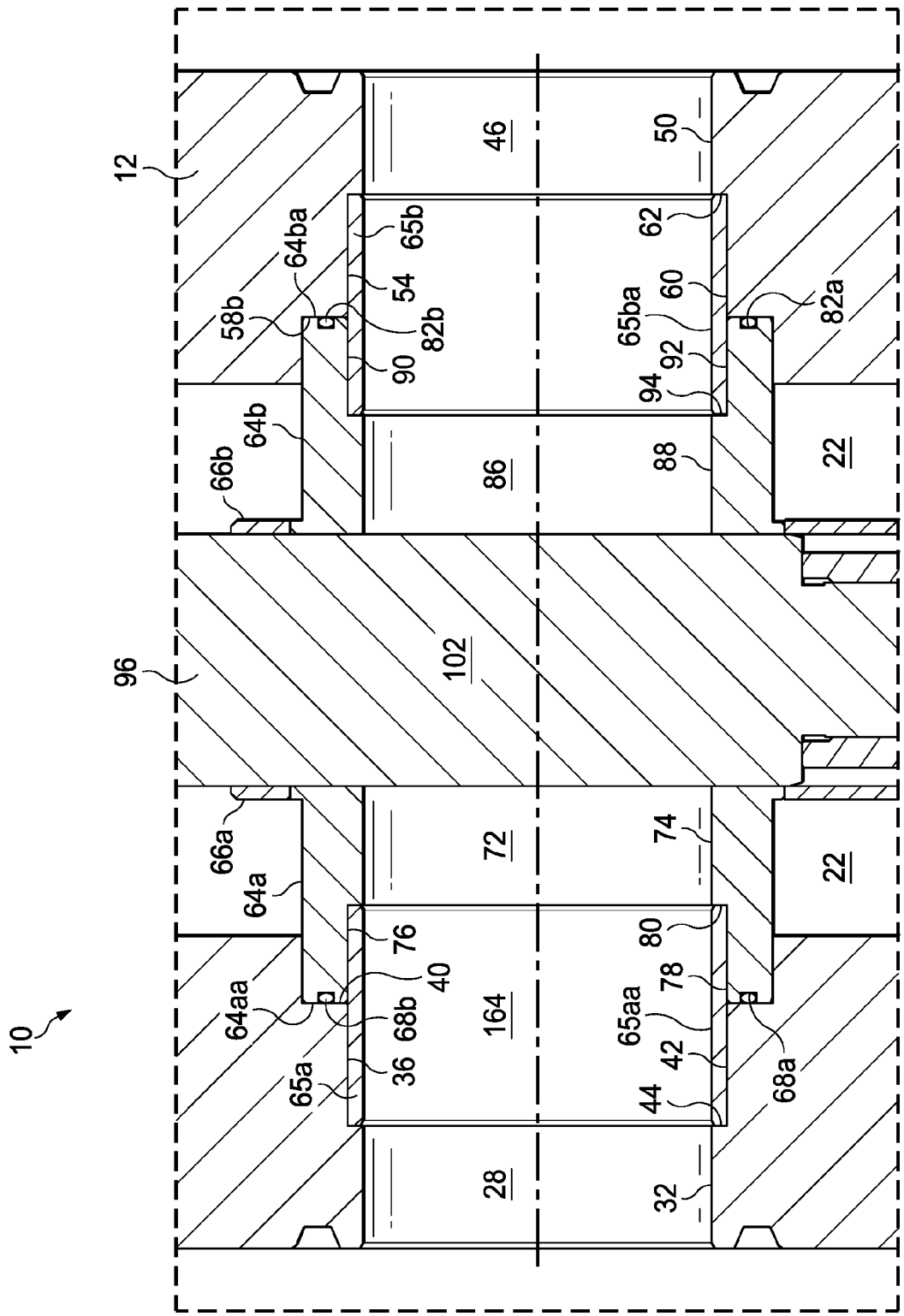
FIG. 8B is a view similar to that of FIG. 8A but depicting the gate valve in a closed configuration, according to an exemplary embodiment.

Referring now to FIGS. 8A and 8B, with continuing reference to FIG. 7, an enlarged view of a portion of the assembled gate valve 10 is illustrated. The face 64aa of the seat element 64a abuts, or nearly abuts, the annular shoulder 40 of the valve body 12. As a result, the interior surface 78 of the seat element 64a is substantially aligned with the interior surface 42 of the valve body 12. In several exemplary embodiments, the inside diameter D2 of the annular recess 36 in the valve body 12 is substantially equal to the inside diameter D6 of the annular recess 76 in the seat element 64a. The annular groove 68a of the seat element 64a accommodates the annular seal 68b, which sealingly engages the annular shoulder 40 of the valve body 12. The annular seal 68b extends between and engages the valve body 12 and the seat element 64a.

Similarly, the face 64ba of the seat element 64b abuts, or nearly abuts, the annular shoulder 58 of the valve body 12. As a result, the interior surface 92 of the seat element 64b is substantially aligned with the interior surface 60 of the valve body 12. In several exemplary embodiments, the inside diameter D4 of the annular recess 54 in the valve body 12 is substantially equal to the inside diameter D8 of the annular recess 90 in the seat element 64b. The annular groove 82a of the seat element 64b accommodates the annular seal 82b, which sealingly engages the annular shoulder 58 of the valve body 12. The annular seal 82b extends between and engages the valve body 12 and the seat element 64b.

The protective sleeve 65a extends within the respective annular recesses 36 and 76 of the valve body 12 and the seat element 64a. Specifically, the protective sleeve 65a engages the interior surface 42 and engages, or nearly engages, the annular shoulder 44 of the valve body 12. Moreover, the protective sleeve 65a engages the interior surface 78 and engages, or nearly engages, the annular shoulder 80 of the seat element 64a. As a result, the interior surface 65aa of the protective sleeve 65a is substantially aligned with the respective interior surfaces 32 and 74 of the valve body 12 and the seat element 64a. In this position, the protective sleeve 65a is adapted to protect the annular seal 68b from blowout, wear-out, and/or deterioration.

In several exemplary embodiments, the full-bore inside diameter D1 of the fluid bore 28 in the valve body 12, the full-bore inside diameter D5 of the fluid bore 72 in the seat element 64a, and the full-bore inside diameter D9 of the protective sleeve 65a, are substantially equal. In several exemplary embodiments, the protective sleeve 65a does not obstruct the full-bore inside diameter D1 of the fluid bore 28 in the valve body 12 or the full-bore inside diameter D5 of the fluid bore 72 in the seat element 64a.

In several exemplary embodiments, the protective sleeve 65a covers the annular seal 68b and is substantially centered on the interface between the face 64aa of the seat element 64a and the annular shoulder 40 of the valve body 12. In several exemplary embodiments, at least a 50% proportion of the protective sleeve 65a extends on each of the opposing sides of the interface between the face 64aa and the annular shoulder 40. In several exemplary embodiments, a smaller proportion of the protective sleeve 65a extends on one of the opposing sides of the interface between the face 64aa and the annular shoulder 40, such as, for example, 49%, 48%, 47%, 46%, 45%, 40%, 35%, 30%, 25%, 20%, or 10%. As a result, in several exemplary embodiments, a larger proportion of the protective sleeve 65a extends on the other of the opposing sides of the interface between the face 64aa and the annular shoulder 40, such as, for example, 51%, 52%, 53%, 54%, 55%, 60%, 65%, 70%, 75%, 80% or 90%, respectively.

The protective sleeve 65b extends within the respective annular recesses 54 and 90 of the valve body 12 and the seat element 64b. Specifically, the protective sleeve 65b engages the interior surface 60 and engages, or nearly engages, the annular shoulder 62 of the valve body 12. Moreover, the protective sleeve 65b engages the interior surface 92 and engages, or nearly engages, the annular shoulder 94 of the seat element 64b. As a result, the interior surface 65ba of the protective sleeve 65b is substantially aligned with the respective interior surfaces 50 and 88 of the valve body 12 and the seat element 64b. In this position, the protective sleeve 65b is adapted to protect the annular seal 82b from blowout, wear-out, and/or deterioration.

In several exemplary embodiments, the full-bore inside diameter D3 of the fluid bore 46 in the valve body 12, the full-bore inside diameter D7 of the fluid bore 86 in the seat element 64b, and the full-bore inside diameter D10 of the protective sleeve 65b, are substantially equal. In several exemplary embodiments, the protective sleeve 65b does not obstruct the full-bore inside diameter D7 of the fluid bore 46 in the valve body 12 or the full-bore inside diameter D7 of the fluid bore 86 in the seat element 64a.

In several exemplary embodiments, the protective sleeve 65b covers the annular seal 82b and is substantially centered on the interface between the face 64ba of the seat element 64b and the annular shoulder 58 of the valve body 12. In several exemplary embodiments, at least a 50% proportion of the protective sleeve 65b extends on each of the opposing sides of the interface between the face 64ba and the annular shoulder 58. In several exemplary embodiments, a smaller proportion of the protective sleeve 65b extends on one of the opposing sides of the interface between the face 64ba and the annular shoulder 58, such as, for example, 49%, 48%, 47%, 46%, 45%, 40%, 35%, 30%, 25%, 20%, or 10%. As a result, in several exemplary embodiments, a larger proportion of the protective sleeve 65b extends on the other of the opposing sides of the interface between the face 64ba and the annular shoulder 58, such as, for example, 51%, 52%, 53%, 54%, 55%, 60%, 65%, 70%, 75%, 80% or 90%, respectively.

In operation, in an exemplary embodiment, as illustrated in FIGS. 8A and 8B with continuing reference to FIGS. 1A-7, the gate valve 10 is actuable between the open configuration and the closed configuration. The gate valve 10 is actuated by using the handle 146 to rotate the adapter stem 134, the ballscrew nut 128, and the upper bearing spacer 132 relative to the ballscrew 126. The rotation of the ballscrew nut 128 displaces the ballscrew 126 and the gate assembly 16 axially in relation to the valve body 12 and the valve seat 14. The axial displacement of gate assembly 16 causes the slab 96 to slidably engage the valve seat 14. Specifically, one side of the slab 96 engages the seat element 64a and the gate guide 66a and the other side of the slab 96 engages the seat element 64b and the gate guide 66b, thus actuating the gate valve 10 between the open configuration and the closed configuration.

In several exemplary embodiments, in operation, the gate valve 10 is part of a fluid system through which fluid flows. In several exemplary embodiments, in operation, the gate valve 10 is part of a "frac stack" used in hydraulic fracturing operations, with fluid flowing through the frac stack, including the gate valve 10, before, during, and/or after hydraulic fracturing operations. In several exemplary embodiments, in operation, the gate valve 10 is a "frac valve."

In the open configuration, as shown in FIG. 8A, a fluid 164 is communicated, or flows, between the fluid bores 28 and 46 of the valve body 12 via the fluid bore 104 of the slab 96, the respective fluid bores 72 and 86 of the seat elements 64a and 64b, and the protective sleeves 65a and 65b. In several exemplary embodiments, the fluid 164 includes liquid materials and solid materials. In several exemplary embodiments, the fluid 164 is, or includes, a slurry that includes liquid materials and solid materials. In several exemplary embodiments, the fluid 164 is a multiphase flow that includes liquid materials, solid materials, and gas materials.

During the flow of the fluid 164 between the fluid bores 28 and 46 of the valve body 12 via the fluid bore 104 of the slab 96, the respective fluid bores 72 and 86 of the seat elements 64a and 64b, and the protective sleeves 65a and 65b, the interior surface 108 of the slab 96 is substantially aligned with the interior surfaces 74 and 88 of the seat elements 64a and 64b, thus preventing, or at least limiting, increased turbulence in the flow of the fluid 164 and resultant wear to the components of the gate valve 10. The enlarged inside diameter portion 116a of the bonnet 112 accommodates the gate nut 110a of the operating stem 98 when the gate assembly 16 is in the open configuration.

Further, the annular seal 68b prevents, or at least reduces, leakage of the fluid 164, along the interface between the seat element 64a and the valve body 12, into the internal region 22. The protective sleeve 65a protects the annular seal 68b from blowout, wear-out, and/or deterioration from the fluid 164. Moreover, the substantial alignment of the interior surface 65aa of the protective sleeve 65a with the interior surface 32 of the valve body 12 and the interior surface 74 of the seat element 64a reduces turbulence in the flow of the fluid 164 and resultant wear to the components of the gate valve 10.

Further still, the annular seal 82b prevents, or at least reduces, leakage of the fluid 164, along the interface between the seat element 64a and the valve body 12, into the internal region 22. The protective sleeve 65b protects the annular seal 82b from blowout, wear-out, and/or deterioration from the fluid 164. Moreover, the substantial alignment of the interior surface 65ba of the protective sleeve 65b with the interior surface 50 of the valve body 12 and the interior surface 88 of the seat element 64b reduces turbulence in the flow of the fluid 164 and resultant wear to the components of the gate valve 10.

Finally, the flow of the fluid 164 imparts axial forces, such as, for example, hydraulic lift to the slab 96 during operation of the gate valve 10. Such axial forces tend to cause misalignment between the interior surface 108 of the slab 96 and the interior surfaces 74 and 88 of the seat elements 64a and 64b, respectively. The pressure of the fluid 164 exiting the fluid bore 46 of the valve body 12 may be communicated to the balancing ports (not shown) in the bonnet 112 and the bonnet 148; such fluid communication facilitates the balancing of axial forces exerted on the gate assembly 16 by the fluid 164 during operation of the gate valve 10.

In the closed configuration, as shown in FIG. 8B, the slab 96 is displaced by the ballscrew assembly 114 so that the block portion 102 of the slab 96 prevents, or at least obstructs, communication of the fluid 164 between the fluid bores 28 and 46, respectively, of the valve body 12. Specifically, the handle 146 rotates the adapter stem 134, the ballscrew nut 128, and the upper bearing spacer 132 in relation to the ballscrew 126, thus displacing the ballscrew 126 and, consequently, the gate assembly 16 axially in relation to the ballscrew nut 128. Once the slab 96 has been sufficiently displaced by the ballscrew assembly 114, the interior surface 108 of the slab 96 no longer substantially aligned with the interior surfaces 74 and 88 of the seat elements 64a and 64b, respectively. Instead, the block portion 102 of the slab 96 is substantially aligned with the interior surfaces 74 and 88 of the seat elements 64a and 64b, respectively. The enlarged inside diameter portion 152a of the bonnet 148 accommodates the gate nut 110b of the balance stem 100 when the gate assembly 16 is in the closed configuration. Moreover, the annular seal 68b prevents, or at least reduces, leakage of the fluid 164, along the interface between the seat element 64a and the valve body 12, into the internal region 22. As a result, the slab 96 prevents, or at least obstructs, communication of the fluid 164 between the fluid bores 28 and 46 of the valve body 12.

In several exemplary embodiments, the protective sleeve 65a does not obstruct either the full-bore inside diameter D1 of the fluid bore 28 in the valve body 12 or the full-bore inside diameter D5 of the fluid bore 72 in the seat element 64a. In several exemplary embodiments, the protective sleeve 65b does not obstruct either the full-bore inside diameter D3 of the fluid bore 46 of the valve body 12 or the full-bore inside diameter D7 of the fluid bore 86 of the seat element 64b. In several exemplary embodiments, even with the extreme pressures, temperatures, and flow rates encountered by the gate valve 10 during operation, the protective sleeves 65a and 65b cover and protect the annular seals 68b and 82b, respectively, from blowout, wear-out, and/or deterioration by the fluid 164.

In several exemplary embodiments, the wear, erosion, and/or complete wash-out of the protective sleeve 65a is prevented, or at least reduced, as a result of the substantial alignment between the interior surface 32 of the valve body 12, the interior surface 74 of the seat element 64a, and the interior surface 65aa of the protective sleeve 65a. In several exemplary embodiments, the wear, erosion, and/or complete wash-out of the protective sleeve 65b is prevented, or at least reduced, as a result of the substantial alignment between the interior surface 50 of the valve body 12, the interior surface 88 of the seat element 64b, and the interior surface 65ba of the protective sleeve 65b.

In several exemplary embodiments, the wear, erosion, and/or complete wash-out of the gate valve 10, including the valve body 12, the protective sleeve 65a, and/or the seat element 64a is prevented, or at least reduced, as a result of the substantial alignment between the interior surface 32 of the valve body 12, the interior surface 65aa of the protective sleeve 65a, and the interior surface 74 of the seat element 64a. In several exemplary embodiments, the wear, erosion, and/or complete wash-out of the gate valve 10, including the valve body 12, the protective sleeve 65b, and/or the seat element 64b is prevented, or at least reduced, as a result of the substantial alignment between the interior surface 50 of the valve body 12, the interior surface 65ba of the protective sleeve 65b, and the interior surface 88 of the seat elements 64b.

In several exemplary embodiments, as illustrated in FIGS. 1A, 1B, 7, and 8A, the full-bore inside diameter D1 of the fluid bore 28, the full-bore inside diameter D9 of the protective sleeve 65a, the full-bore inside diameter D5 of the seat element 64a, the full-bore inside diameter D11 of the fluid bore 104 of the slab 96, the full-bore inside diameter D7 of the seat element 64b, the full-bore inside diameter D10 of the protective sleeve 65b, and the full-bore inside diameter D3 of the fluid bore 46, are all substantially equal; therefore, in operation, when the gate assembly 16 is in the open configuration as shown in FIG. 8A, the fluid 164 flows through the gate valve 10 via a substantially constant, full-bore diameter across the gate valve 10, the constant, full-bore diameter equaling the respective full-bore inside diameters D1 and D3 of the fluid bores 28 and 46. During this fluid flow, the protective sleeves 65a and 65b protect the annular seals 68b and 82b, respectively, from the flow of the fluid 164, thereby reducing the likelihood of blowout, wear-out, and/or deterioration of each of the annular seals 68b and 82b. Since the fluid 164 flows through the gate valve 10 via a substantially constant, full-bore diameter across the gate valve 10, the flow characteristics and/or parameters of the flow of the fluid 164 through the gate valve 10 (e.g., fluid flow rate, fluid pressure, degree of turbulence of fluid flow, etc.) are not appreciably affected by the inclusion of the protective sleeves 65a and 65b. Therefore, the annular seals 68b and 82b are protected from blowout, wear-out, and/or deterioration without affecting the flow characteristics and/or parameters of the flow of the fluid 164 through the gate valve 10.

In an exemplary embodiment, a method of assembling the gate valve 10 includes placing the gate valve 10 in the assembled condition described above and illustrated in FIG. 7. In an exemplary embodiment, a method of disassembling the gate valve 10 includes placing the gate valve 10 in an unassembled condition.

In an exemplary embodiment, a method of retrofitting the gate valve 10 includes at least partially disassembling the gate valve 10, removing the protective sleeve 65a or 65b, and reassembling the gate valve 10 with a new protective sleeve that is identical to the protective sleeve 65a or 65b but has never been used, or has been used less than the protective sleeve 65a or 65b. In an exemplary embodiment, a method of retrofitting the gate valve 10 includes at least partially disassembling the gate valve 10, removing the protective sleeves 65a and 65b, and reassembling the gate valve 10 with new protective sleeves that are identical to the protective sleeves 65a and 65b but have never been used, or have been used less than the protective sleeves 65a and 65b.

In an exemplary embodiment, each of the foregoing retrofitting methods may be carried out after the gate valve 10 has completed a predetermined time of operation, after a predetermined amount of time has passed since the gate valve 10 was first used in the field, after it is determined that the protective sleeves 65a and 65b have completed their respective useful operational lives, or after it is determined that at least one of the protective sleeves 65a and 65b has completed its useful operational life. In several exemplary embodiments, the ability to retrofit the gate valve 10 increases the operational life of the gate valve 10 as a whole.

In an exemplary embodiment, at least partially disassembling the gate valve 10 to, for example, retrofit the gate valve 10 in accordance with the foregoing, includes: disconnecting the operating end 18 from the valve body 12, disconnecting the balancing end 20 from the valve body 12, removing the gate assembly 16 from the valve body 12 to provide access to the internal region 22, and removing the valve seat 14 from the valve body 12.

The present disclosure introduces a gate valve, the gate valve including a valve body, defining: an internal region; a first fluid bore intersecting the internal region and defining a first interior surface in the valve body; and a first annular recess formed in the first interior surface and adjoining the internal region; a first seat element defining a second fluid bore and extending within the first annular recess; and a first protective sleeve extending between respective portions of the first seat element and the valve body; wherein the first fluid bore has a first full-bore inside diameter; wherein the second fluid bore has a second full-bore inside diameter that is substantially equal to the first full-bore inside diameter; and wherein the first protective sleeve has a third full-bore inside diameter that is substantially equal to each of the first and second full-bore inside diameters. In an exemplary embodiment, the third full-bore inside diameter of the first protective sleeve is substantially equal to each of the first and second full-bore inside diameters so that the first protective sleeve does not obstruct either the first full-bore inside diameter of the first fluid bore in the valve body or the second full-bore inside diameter of the second fluid bore in the first seat element. In an exemplary embodiment, the second bore and the first protective sleeve define second and third interior surfaces, respectively; wherein the first, second, and third interior surfaces are substantially aligned; and wherein wear, erosion, and/or complete wash-out of the first protective sleeve is prevented, or at least reduced, as a result of the substantial alignment between the first, second, and third interior surfaces. In an exemplary embodiment, the gate valve includes a first annular seal extending between and engaging the valve body and the first seat element; wherein the first protective sleeve is adapted to protect the first annular seal, reducing the likelihood of blowout, wear-out, and/or deterioration of the first annular seal. In an exemplary embodiment, the second bore defines a second interior surface; wherein the first seat element further defines a second annular recess formed in the second interior surface; and wherein the first protective sleeve extends within the second annular recess. In an exemplary embodiment, the first annular recess defines a first annular shoulder in the valve body and the first seat element defines a first face, the first face abutting, or nearly abutting, the first annular shoulder along a first interface; and wherein a proportion of the first protective sleeve extends on one side of the first interface so that the remaining proportion of the first protective sleeve extends on the other side of the first interface. In an exemplary embodiment, the valve body further defines: a third fluid bore intersecting the internal region and defining a second interior surface in the valve body; and a second annular recess formed in the second interior surface and adjoining the internal region; and wherein the gate valve further includes: a second seat element defining a fourth fluid bore and extending within the second annular recess; and a second protective sleeve extending between respective portions of the second seat element and the valve body. In an exemplary embodiment, the third fluid bore has a fourth full-bore inside diameter, the fourth fluid bore has a fifth full-bore inside diameter, and the second protective sleeve has a sixth full-bore inside diameter; and wherein the first, second, third, fourth, fifth, and sixth full-bore inside diameters are substantially equal. In an exemplary embodiment, the first, second, third, fourth, fifth, and sixth full-bore inside diameters are substantially equal so that, when a fluid flows through the gate valve, the fluid flows through the gate valve via a substantially constant, full-bore diameter across the gate valve. In an exemplary embodiment, the gate valve includes a first annular seal extending between and engaging the valve body and the first seat element; and a second annular seal extending between and engaging the valve body and the second seat element; wherein the first and second protective sleeves are adapted to protect the first and second annular seals, respectively, reducing the likelihood of blowout, wear-out, and/or deterioration of the first and second annular seals. In an exemplary embodiment, the gate valve includes a gate including a fifth fluid bore; wherein the gate is actuable between: an open configuration, in which a fluid is permitted to flow through the first, second, third, fourth, and fifth fluid bores, and a closed configuration, in which the fluid is restricted from flowing through the fifth fluid bore. In an exemplary embodiment, the first annular recess defines a first annular shoulder in the valve body and the first seat element defines a first face, the first face abutting, or nearly abutting, the first annular shoulder along a first interface; and wherein the second annular recess defines a second annular shoulder in the valve body and the second seat element defines a second face, the second face abutting, or nearly abutting, the second annular shoulder along a second interface. In an exemplary embodiment, a proportion of the first protective sleeve extends on one side of the first interface so that the remaining proportion of the first protective sleeve extends on the other side of the first interface; and wherein a proportion of the second protective sleeve extends on one side of the second interface so that the remaining proportion of the second protective sleeve extends on the other side of the second interface.

The present disclosure also introduces a gate valve that includes a valve body, defining: an internal region; a first fluid bore intersecting the internal region and defining a first interior surface in the valve body; a first annular recess formed in the first interior surface, the first annular recess adjoining the internal region; and a second annular recess formed in the first interior surface, the second annular recess adjoining the first annular recess; a first seat element extending within the first annular recess, the first seat element defining: a second fluid bore defining a second interior surface; and a third annular recess formed in the second interior surface; and a first protective sleeve extending within the second and third annular recesses. In an exemplary embodiment, the gate valve includes a first annular seal extending between and engaging the valve body and the first seat element; wherein the first protective sleeve is adapted to protect the first annular seal, reducing the likelihood of blowout, wear-out, and/or deterioration of the first annular seal. In an exemplary embodiment, the first bore, the second bore, and the first protective sleeve define first, second, and third interior surfaces, respectively; wherein the first, second, and third interior surfaces are substantially aligned; and wherein wear, erosion, and/or complete wash-out of the first protective sleeve is prevented, or at least reduced, as a result of the substantial alignment between the first, second, and third interior surfaces. In an exemplary embodiment, the first fluid bore has a first full-bore inside diameter, the second fluid bore has a second full-bore inside diameter, and the first protective sleeve has a third full-bore inside diameter, the first, second, and third full-bore inside diameters being substantially equal. In an exemplary embodiment, the third full-bore inside diameter of the first protective sleeve is substantially equal to each of the first and second full-bore inside diameters so that the first protective sleeve does not obstruct either the first full-bore inside diameter of the first fluid bore in the valve body or the second full-bore inside diameter of the second fluid bore in the first seat element. In an exemplary embodiment, the second and third annular recesses have fourth and fifth inside diameters, respectively, the fourth and fifth inside diameters being substantially equal. In an exemplary embodiment, the first annular recess defines a first annular shoulder in the valve body and the first seat element defines a first face, the first face abutting, or nearly abutting, the first annular shoulder along a first interface; and wherein a proportion of the first protective sleeve extends on one side of the first interface so that the remaining proportion of the first protective sleeve extends on the other side of the first interface. In an exemplary embodiment, the valve body further defines: a third fluid bore intersecting the internal region and defining a third interior surface in the valve body; a fourth annular recess formed in the third interior surface, the fourth annular recess adjoining the internal region; and a fifth annular recess formed in the third interior surface, the fifth annular recess adjoining the fourth annular recess; and wherein the gate valve further includes: a second seat element extending within the fourth annular recess, the second seat element defining: a fourth fluid bore defining a fourth interior surface; and a sixth annular recess formed in the fourth interior surface; and a second protective sleeve extending within the fifth and sixth annular recesses. In an exemplary embodiment, the gate valve includes a first annular seal extending between and engaging the valve body and the first seat element; and a second annular seal extending between and engaging the valve body and the second seat element; wherein the first and second protective sleeves are adapted to protect the first and second annular seals, respectively, reducing the likelihood of blowout, wear-out, and/or deterioration of the first and second annular seals. In an exemplary embodiment, the first annular recess defines a first annular shoulder in the valve body and the first seat element defines a first face, the first face abutting, or nearly abutting, the first annular shoulder along a first interface; wherein the fourth annular recess defines a second annular shoulder in the valve body and the second seat element defines a second face, the second face abutting, or nearly abutting, the second annular shoulder along a second interface; wherein a proportion of the first protective sleeve extends on one side of the first interface so that the remaining proportion of the first protective sleeve extends on the other side of the first interface; and wherein a proportion of the second protective sleeve extends on one side of the second interface so that the remaining proportion of the second protective sleeve extends on the other side of the second interface. In an exemplary embodiment, the first fluid bore has a first full-bore inside diameter, the second fluid bore has a second full-bore inside diameter, and the first protective sleeve has a third full-bore inside diameter, the first, second, and third full-bore inside diameters being substantially equal; and wherein the third fluid bore has a fourth full-bore inside diameter, the fourth fluid bore has a fifth full-bore inside diameter, and the second protective sleeve has a sixth full-bore inside diameter, the fourth, fifth, and sixth full-bore inside diameters being substantially equal. In an exemplary embodiment, the first, second, third, fourth, fifth, and sixth full-bore inside diameters are substantially equal so that, when a fluid flows through the gate valve, the fluid flows through the gate valve via a substantially constant, full-bore diameter across the gate valve. In an exemplary embodiment, the second and third annular recesses have seventh and eighth inside diameters, respectively, the seventh and eighth inside diameters being substantially equal; and wherein the fifth and sixth annular recesses have ninth and tenth inside diameters, respectively, the ninth and tenth inside diameters being substantially equal.

The present disclosure also introduces a gate valve that includes a valve body, defining: an internal region; a first fluid bore intersecting the internal region and defining a first interior surface in the valve body; and a first annular recess formed in the first interior surface and adjoining the internal region, the first annular recess defining a first annular shoulder in the valve body; a first seat element defining a second fluid bore and extending within the first annular recess, the first seat element defining a first face; and a first protective sleeve extending between respective portions of the first seat element and the valve body; wherein the first face abuts, or nearly abuts, the first annular shoulder along a first interface. In an exemplary embodiment, a proportion of the first protective sleeve extends on one side of the first interface so that the remaining proportion of the first protective sleeve extends on the other side of the first interface. In an exemplary embodiment, wherein the valve body further defines: a third fluid bore intersecting the internal region and defining a second interior surface in the valve body; and a second annular recess formed in the second interior surface and adjoining the internal region, the second annular recess defining a second annular shoulder in the valve body; wherein the gate valve further includes: a second seat element including a fourth fluid bore and extending within the second annular recess, the second seat element defining a second face; and a second protective sleeve extending between respective portions of the second seat element and the valve body; and wherein the second face abuts, or nearly abuts, the second annular shoulder along a second interface. In an exemplary embodiment, a proportion of the first protective sleeve extends on one side of the first interface so that the remaining proportion of the first protective sleeve extends on the other side of the first interface; and wherein a proportion of the second protective sleeve extends on one side of the second interface so that the remaining proportion of the second protective sleeve extends on the other side of the second interface.

The present disclosure also introduces a valve seat adapted to be engaged with a valve body of a gate valve, the valve body having a first full-bore diameter, the valve seat including: a first seat element adapted to extend within a first annular recess of the valve body, the first seat element defining: a first fluid bore, the first fluid bore defining a first interior surface; and a first annular recess formed in the first interior surface, the first annular recess defining a first face; wherein the first fluid bore has a second full-bore diameter that is substantially equal to the first full-bore diameter of the valve body with which the valve seat is adapted to be engaged. In an exemplary embodiment, the first seat element defines a first face adapted to abut, or nearly abut, a first annular shoulder of the valve body. In an exemplary embodiment, the valve seat includes a first annular groove formed in the first face; and a first annular seal extending within the first annular groove; wherein the first annular seal is adapted to sealingly engage the first annular shoulder of the valve body. In an exemplary embodiment, the valve seat includes a second seat element adapted to extend within a second annular recess of the valve body, the second seat element defining: a second fluid bore, the second fluid bore defining a second interior surface; and a second annular recess formed in the second interior surface, the second annular recess defining a second face; wherein the second fluid bore has a third full-bore diameter that is substantially equal to each of: the first full-bore diameter of the valve body with which the valve seat is adapted to be engaged; and the second full-bore diameter. In an exemplary embodiment, the first seat element defines a first face adapted to abut, or nearly abut, a first annular shoulder of the valve body; and wherein the second seat element defines a second face adapted to abut, or nearly abut, a second annular shoulder of the valve body. In an exemplary embodiment, the valve seat includes first and second annular grooves formed in the first and second faces, respectively; and first and second annular seals extending within the first and second annular grooves, respectively; wherein the first and second annular seals are adapted to sealingly engage the first and second annular shoulders, respectively, of the valve body.

The present disclosure also introduces a kit for a gate valve, the kit including: a valve body, defining: an internal region; a first fluid bore intersecting the internal region and defining a first interior surface in the valve body; and a first annular recess formed in the first interior surface and adjoining the internal region; a first seat element defining a second fluid bore and adapted to extend within the first annular recess; and a first protective sleeve adapted to extend between respective portions of the first seat element and the valve body; wherein the first fluid bore has a first full-bore inside diameter; wherein the second fluid bore has a second full-bore inside diameter that is substantially equal to the first full-bore inside diameter; and wherein the first protective sleeve has a third full-bore inside diameter that is substantially equal to each of the first and second full-bore inside diameters. In an exemplary embodiment, the third full-bore inside diameter of the first protective sleeve is substantially equal to each of the first and second full-bore inside diameters so that the first protective sleeve does not obstruct either the first full-bore inside diameter of the first fluid bore in the valve body or the second full-bore inside diameter of the second fluid bore in the first seat element. In an exemplary embodiment, the second bore and the first protective sleeve define second and third interior surfaces, respectively; wherein the first, second, and third interior surfaces are adapted to be substantially aligned; and wherein wear, erosion, and/or complete wash-out of the first protective sleeve is prevented, or at least reduced, as a result of the substantial alignment between the first, second, and third interior surfaces. In an exemplary embodiment, the kit includes a first annular seal adapted to extend between and engage the valve body and the first seat element; wherein the first protective sleeve is adapted to protect the first annular seal, reducing the likelihood of blowout, wear-out, and/or deterioration of the first annular seal. In an exemplary embodiment, the second bore defines a second interior surface; wherein the first seat element further defines a second annular recess formed in the second interior surface; and wherein the first protective sleeve is adapted to extend within the second annular recess. In an exemplary embodiment, the first annular recess defines a first annular shoulder in the valve body and the first seat element defines a first face, wherein the first face is adapted to abut, or nearly abut, the first annular shoulder along a first interface; and wherein a proportion of the first protective sleeve is adapted to extend on one side of the first interface so that the remaining proportion of the first protective sleeve extends on the other side of the first interface. In an exemplary embodiment, the valve body further defines: a third fluid bore intersecting the internal region and defining a second interior surface in the valve body; and a second annular recess formed in the second interior surface and adjoining the internal region; and wherein the gate valve further includes: a second seat element defining a fourth fluid bore and adapted to extend within the second annular recess; and a second protective sleeve extending between respective portions of the second seat element and the valve body. In an exemplary embodiment, the third fluid bore has a fourth full-bore inside diameter, the fourth fluid bore has a fifth full-bore inside diameter, and the second protective sleeve has a sixth full-bore inside diameter; and wherein the first, second, third, fourth, fifth, and sixth full-bore inside diameters are substantially equal. In an exemplary embodiment, the first, second, third, fourth, fifth, and sixth full-bore inside diameters are substantially equal so that, when a fluid flows through the gate valve, the fluid flows through the gate valve via a substantially constant, full-bore diameter across the gate valve. In an exemplary embodiment, the kit includes a first annular seal extending between and engaging the valve body and the first seat element; and a second annular seal extending between and engaging the valve body and the second seat element; wherein the first and second protective sleeves are adapted to protect the first and second annular seals, respectively, reducing the likelihood of blowout, wear-out, and/or deterioration of the first and second annular seals. In an exemplary embodiment, the kit includes a gate including a fifth fluid bore; wherein the gate is adapted to be actuable between: an open configuration, in which a fluid is permitted to flow through the first, second, third, fourth, and fifth fluid bores, and a closed configuration, in which the fluid is restricted from flowing through the fifth fluid bore. In an exemplary embodiment, the first annular recess defines a first annular shoulder in the valve body and the first seat element defines a first face, the first face abutting, or nearly abutting, the first annular shoulder along a first interface; and wherein the second annular recess defines a second annular shoulder in the valve body and the second seat element defines a second face, the second face abutting, or nearly abutting, the second annular shoulder along a second interface. In an exemplary embodiment, a proportion of the first protective sleeve is adapted to extend on one side of the first interface so that the remaining proportion of the first protective sleeve extends on the other side of the first interface; and wherein a proportion of the second protective sleeve is adapted to extend on one side of the second interface so that the remaining proportion of the second protective sleeve extends on the other side of the second interface.

The present disclosure also introduces a kit for a gate valve, the kit including a valve body, defining: an internal region; a first fluid bore intersecting the internal region and defining a first interior surface in the valve body; a first annular recess formed in the first interior surface, the first annular recess adjoining the internal region; and a second annular recess formed in the first interior surface, the second annular recess adjoining the first annular recess; a first seat element adapted to extend within the first annular recess, the first seat element defining: a second fluid bore defining a second interior surface; and a third annular recess formed in the second interior surface; and a first protective sleeve adapted to extend within the second and third annular recesses. In an exemplary embodiment, the kit includes a first annular seal adapted to extend between and engage the valve body and the first seat element; wherein the first protective sleeve is adapted to protect the first annular seal, reducing the likelihood of blowout, wear-out, and/or deterioration of the first annular seal. In an exemplary embodiment, the first bore, the second bore, and the first protective sleeve define first, second, and third interior surfaces, respectively; wherein the first, second, and third interior surfaces are adapted to be substantially aligned; and wherein wear, erosion, and/or complete wash-out of the first protective sleeve is prevented, or at least reduced, as a result of the substantial alignment between the first, second, and third interior surfaces. In an exemplary embodiment, the first fluid bore has a first full-bore inside diameter, the second fluid bore has a second full-bore inside diameter, and the first protective sleeve has a third full-bore inside diameter, the first, second, and third full-bore inside diameters being substantially equal. In an exemplary embodiment, the third full-bore inside diameter of the first protective sleeve is substantially equal to each of the first and second full-bore inside diameters so that the first protective sleeve does not obstruct either the first full-bore inside diameter of the first fluid bore in the valve body or the second full-bore inside diameter of the second fluid bore in the first seat element. In an exemplary embodiment, the second and third annular recesses have fourth and fifth inside diameters, respectively, the fourth and fifth inside diameters being substantially equal. In an exemplary embodiment, the first annular recess defines a first annular shoulder in the valve body and the first seat element defines a first face, the first face abutting, or nearly abutting, the first annular shoulder along a first interface; and wherein a proportion of the first protective sleeve is adapted to extend on one side of the first interface so that the remaining proportion of the first protective sleeve extends on the other side of the first interface. In an exemplary embodiment, the valve body further defines: a third fluid bore intersecting the internal region and defining a third interior surface in the valve body; a fourth annular recess formed in the third interior surface, the fourth annular recess adjoining the internal region; and a fifth annular recess formed in the third interior surface, the fifth annular recess adjoining the fourth annular recess; and wherein the gate valve further includes: a second seat element adapted to extend within the fourth annular recess, the second seat element defining: a fourth fluid bore defining a fourth interior surface; and a sixth annular recess formed in the fourth interior surface; and a second protective sleeve adapted to extend within the fifth and sixth annular recesses. In an exemplary embodiment, the kit includes a first annular seal adapted to extend between and engage the valve body and the first seat element; and a second annular seal adapted to extend between and engage the valve body and the second seat element; wherein the first and second protective sleeves are adapted to protect the first and second annular seals, respectively, reducing the likelihood of blowout, wear-out, and/or deterioration of the first and second annular seals. In an exemplary embodiment, the first annular recess defines a first annular shoulder in the valve body and the first seat element defines a first face, the first face being adapted to abut, or nearly abut, the first annular shoulder along a first interface; wherein the fourth annular recess defines a second annular shoulder in the valve body and the second seat element defines a second face, the second face being adapted to abut, or nearly abut, the second annular shoulder along a second interface; wherein a proportion of the first protective sleeve is adapted to extend on one side of the first interface so that the remaining proportion of the first protective sleeve extends on the other side of the first interface; and wherein a proportion of the second protective sleeve is adapted to extend on one side of the second interface so that the remaining proportion of the second protective sleeve extends on the other side of the second interface. In an exemplary embodiment, the first fluid bore has a first full-bore inside diameter, the second fluid bore has a second full-bore inside diameter, and the first protective sleeve has a third full-bore inside diameter, the first, second, and third full-bore inside diameters being substantially equal; and wherein the third fluid bore has a fourth full-bore inside diameter, the fourth fluid bore has a fifth full-bore inside diameter, and the second protective sleeve has a sixth full-bore inside diameter, the fourth, fifth, and sixth full-bore inside diameters being substantially equal. In an exemplary embodiment, the first, second, third, fourth, fifth, and sixth full-bore inside diameters are substantially equal so that, when a fluid flows through the gate valve, the fluid flows through the gate valve via a substantially constant, full-bore diameter across the gate valve. In an exemplary embodiment, the second and third annular recesses have seventh and eighth inside diameters, respectively, the seventh and eighth inside diameters being substantially equal; and wherein the fifth and sixth annular recesses have ninth and tenth inside diameters, respectively, the ninth and tenth inside diameters being substantially equal.

The present disclosure also introduces a kit for a gate valve, the kit including: a valve body, defining: an internal region; a first fluid bore intersecting the internal region and defining a first interior surface in the valve body; and a first annular recess formed in the first interior surface and adjoining the internal region, the first annular recess defining a first annular shoulder in the valve body; a first seat element defining a second fluid bore and adapted to extend within the first annular recess, the first seat element defining a first face; and a first protective sleeve adapted to extend between respective portions of the first seat element and the valve body; wherein the first face is adapted to abut, or nearly abut, the first annular shoulder along a first interface. In an exemplary embodiment, a proportion of the first protective sleeve is adapted to extend on one side of the first interface so that the remaining proportion of the first protective sleeve extends on the other side of the first interface. In an exemplary embodiment, the valve body further defines: a third fluid bore intersecting the internal region and defining a second interior surface in the valve body; and a second annular recess formed in the second interior surface and adjoining the internal region, the second annular recess defining a second annular shoulder in the valve body; wherein the gate valve further includes: a second seat element including a fourth fluid bore and adapted to extend within the second annular recess, the second seat element defining a second face; and a second protective sleeve adapted to extend between respective portions of the second seat element and the valve body; and wherein the second face is adapted to abut, or nearly abut, the second annular shoulder along a second interface. In an exemplary embodiment, a proportion of the first protective sleeve is adapted to extend on one side of the first interface so that the remaining proportion of the first protective sleeve extends on the other side of the first interface; and wherein a proportion of the second protective sleeve is adapted to extend on one side of the second interface so that the remaining proportion of the second protective sleeve extends on the other side of the second interface.

The present disclosure also introduces one or more methods according to one or more aspects of the present disclosure.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A gate valve, comprising:
   a bonnet;
   a monolithic valve body to which the bonnet is connected, the monolithic valve body defining first and second external surfaces, the second external surface being perpendicular to the first external surface, the bonnet engaging the first external surface, the monolithic valve body comprising:
   a passage formed in the first external surface along a first longitudinal center axis to define a cylindrical internal region in the monolithic valve body, the cylindrical internal region defining a first interior surface in the monolithic valve body, the first interior surface extending circumferentially about the first longitudinal center axis;
   a first fluid bore formed in the second external surface along a second longitudinal center axis, the first fluid bore intersecting the cylindrical internal region and defining a second interior surface in the monolithic valve body;
   a first annular recess formed in the second interior surface and defining a third interior surface in the monolithic valve body, the third interior surface extending circumferentially about the second longitudinal center axis and adjoining the first interior surface;
   a second annular recess formed in the second interior surface, the second annular recess defining a fourth interior surface in the monolithic valve body;
   a first annular shoulder defined in the monolithic valve body outside of the cylindrical internal region and located between:
      the first interior surface defined in the monolithic valve body by the cylindrical internal region; and
      the second interior surface defined in the monolithic valve body by the first fluid bore;
   and
   a second annular shoulder defined in the monolithic valve body outside of the cylindrical internal region and located between:
      the first annular shoulder; and
      the second interior surface defined in the monolithic valve body by the first fluid bore;
   a first seat element extending within the first annular recess and the cylindrical internal region, the first seat element defining:
      a second fluid bore defining a fifth interior surface in the first seat element; and
      a third annular recess formed in the fifth interior surface and defining a sixth interior surface in the first seat element, the sixth interior surface being aligned flush with the fourth interior surface;
   and
   a first protective sleeve extending within the second and third annular recesses on opposing sides of the first annular shoulder;
   wherein the second and third annular recesses have first and second inside diameters, respectively, the first and second inside diameters being substantially equal;
   wherein the first protective sleeve comprises opposing first and second end portions;
   wherein the first end portion of the first protective sleeve extends within the second annular recess;
   wherein the second end portion of the first protective sleeve extends within the third annular recess;
   wherein the first end portion of the first protective sleeve defines a first outside diameter of the first protective sleeve;
   wherein the second end portion of the first protective sleeve defines a second outside diameter of the first protective sleeve;

wherein the first outside diameter at the first end portion of the first protective sleeve is equal to the second outside diameter at the second end portion of the first protective sleeve;

wherein the first protective sleeve defines an inside circumferentially-extending surface and an outside circumferentially-extending surface radially spaced from the inside circumferentially-extending surface; and wherein the first protective sleeve is devoid of any openings extending radially therethrough from the outside circumferentially-extending surface to the inside circumferentially-extending surface.

2. The gate valve of claim 1, further comprising:

a first annular seal extending between and engaging the monolithic valve body and the first seat element;

wherein the first protective sleeve is adapted to protect the first annular seal, reducing the likelihood of blowout, wear-out, and/or deterioration of the first annular seal.

3. The gate valve of claim 1, wherein the first protective sleeve defines a seventh interior surface;

wherein the second, fifth, and seventh interior surfaces are substantially aligned; and wherein wear, erosion, and/or complete wash-out of the first protective sleeve is prevented, or at least reduced, as a result of the substantial alignment between the second, fifth, and seventh interior surfaces.

4. The gate valve of claim 1, wherein the first fluid bore has a first full-bore inside diameter, the second fluid bore has a second full-bore inside diameter, and the first protective sleeve has a third full-bore inside diameter, the first, second, and third full-bore inside diameters being substantially equal.

5. The gate valve of claim 4, wherein the first protective sleeve does not obstruct either the first full-bore inside diameter of the first fluid bore in the monolithic valve body or the second full-bore inside diameter of the second fluid bore in the first seat element.

6. The gate valve of claim 1, wherein the monolithic valve body further defines:

a third fluid bore intersecting the cylindrical internal region and defining a seventh interior surface in the monolithic valve body;

a fourth annular recess formed in the seventh interior surface; and a fifth annular recess formed in the seventh interior surface, the fifth annular recess adjoining the fourth annular recess and defining an eighth interior surface in the monolithic valve body;

and wherein the gate valve further comprises:

a second seat element extending within the fourth annular recess and the cylindrical internal region, the second seat element defining:

a fourth fluid bore defining a ninth interior surface in the second seat element; and a sixth annular recess formed in the ninth interior surface and defining a tenth interior surface in the second seat element, tenth interior surface being aligned flush with the eighth interior surface; and a second protective sleeve extending within the fifth and sixth annular recesses.

7. The gate valve of claim 6, further comprising:

a first annular seal extending between and engaging the monolithic valve body and the first seat element; and a second annular seal extending between and engaging the monolithic valve body and the second seat element;

wherein the first and second protective sleeves are adapted to protect the first and second annular seals, respectively, reducing the likelihood of blowout, wear-out, and/or deterioration of the first and second annular seals.

8. The gate valve of claim 6, wherein the first annular recess defines the first annular shoulder in the monolithic valve body;

wherein the fourth annular recess defines a third annular shoulder in the monolithic valve body; and wherein the second protective sleeve extends on opposing sides of third annular shoulder.

9. The gate valve of claim 6, wherein the first fluid bore has a first full-bore inside diameter, the second fluid bore has a second full-bore inside diameter, and the first protective sleeve has a third full-bore inside diameter, the first, second, and third full-bore inside diameters being substantially equal; and wherein the third fluid bore has a fourth full-bore inside diameter, the fourth fluid bore has a fifth full-bore inside diameter, and the second protective sleeve has a sixth full-bore inside diameter, the fourth, fifth, and sixth full-bore inside diameters being substantially equal.

10. The gate valve of claim 9, wherein the first, second, third, fourth, fifth, and sixth full-bore inside diameters are substantially equal so that, when a fluid flows through the gate valve, the fluid flows through the gate valve via a substantially constant, full-bore diameter across the gate valve.

11. The gate valve of claim 6, wherein the fifth and sixth annular recesses have third and fourth inside diameters, respectively, the third and fourth inside diameters being substantially equal.

12. A gate valve, comprising:

a bonnet;

a monolithic valve body to which the bonnet is connected, the monolithic valve body defining first and second external surfaces, the second external surface being perpendicular to the first external surface, the bonnet engaging the first external surface, the monolithic valve body comprising:

a passage formed in the first external surface along a first longitudinal center axis to define a cylindrical internal region in the monolithic valve body, the cylindrical internal region defining a first interior surface in the monolithic valve body, the first interior surface extending circumferentially about the first longitudinal center axis;

a first fluid bore formed in the second external surface along a second longitudinal center axis, the first fluid bore intersecting the cylindrical internal region and defining a second interior surface in the monolithic valve body;

a first annular recess formed in the second interior surface and defining a third interior surface in the monolithic valve body, the third interior surface extending circumferentially about the second longitudinal center axis and adjoining the first interior surface;

a first annular shoulder defined in the monolithic valve body outside of the cylindrical internal region and located between:

the first interior surface defined in the monolithic valve body by the cylindrical internal region; and
the second interior surface defined in the monolithic valve body by the first fluid bore;
and
a second annular shoulder defined in the monolithic valve body outside of the cylindrical internal region and located between:
the first annular shoulder; and
the second interior surface defined in the monolithic valve body by the first fluid bore;
a first monolithic seat element extending within the first annular recess and the cylindrical internal region, the first monolithic seat element comprising a second fluid bore defining a fourth interior surface in the first monolithic seat element;
a first annular seal extending between and engaging the monolithic valve body and the first monolithic seat element; and
a first protective sleeve extending on opposing sides of the first annular shoulder;
wherein the first fluid bore of the monolithic valve body has a first full-bore inside diameter, the second fluid bore of the first monolithic seat element has a second full-bore inside diameter, and the first protective sleeve has a third full-bore inside diameter, the first, second, and third full-bore inside diameters being substantially equal;
wherein the first protective sleeve defines an inside circumferentially-extending surface and an outside circumferentially-extending surface radially spaced from the inside circumferentially-extending surface; and
wherein the first protective sleeve is devoid of any openings extending radially therethrough from the outside circumferentially-extending surface to the inside circumferentially-extending surface.

13. The gate valve of claim 12,
wherein the monolithic valve body further comprises a second annular recess formed in the second interior surface and adjoining the first annular recess;
wherein the first monolithic seat element further comprises a third annular recess formed in the fourth interior surface; and
wherein the first protective sleeve extends within the second and third annular recesses.

14. The gate valve of claim 12,
wherein the first protective sleeve defines fifth interior surface;
wherein the second, fourth, and fifth interior surfaces are substantially aligned; and
wherein wear, erosion, and/or complete wash-out of the first protective sleeve is prevented, or at least reduced, as a result of the substantial alignment between the second, fourth, and fifth interior surfaces.

15. The gate valve of claim 12,
wherein the first protective sleeve is adapted to protect the first annular seal, reducing the likelihood of blowout, wear-out, and/or deterioration of the first annular seal.

16. The gate valve of claim 12,
wherein the first protective sleeve does not obstruct either the first full-bore inside diameter of the first fluid bore in the monolithic valve body or the second full-bore inside diameter of the second fluid bore in the first monolithic seat element.

17. The gate valve of claim 12,
wherein the monolithic valve body further defines:
a third fluid bore intersecting the cylindrical internal region and defining a fifth interior surface in the monolithic valve body; and
a fourth annular recess formed in the fifth interior surface and defining a third annular shoulder in the monolithic valve body;
and
wherein the gate valve further comprises:
a second monolithic seat element extending within the fourth annular recess and the cylindrical internal region, the second monolithic seat element comprising a fourth fluid bore defining a sixth interior surface in the second monolithic seat element; and
a second protective sleeve extending on opposing sides of the third annular shoulder.

18. The gate valve of claim 17,
wherein the monolithic valve body further defines a fifth annular recess formed in the fifth interior surface, the fifth annular recess adjoining the fourth annular recess;
wherein the second monolithic seat element further defines a sixth annular recess formed in the sixth interior surface; and
wherein the second protective sleeve extends within the fifth and sixth annular recesses.

19. The gate valve of claim 17, further comprising:
a second annular seal extending between and engaging the monolithic valve body and the second monolithic seat element;
wherein the second protective sleeve is adapted to protect the second annular seal, reducing the likelihood of blowout, wear-out, and/or deterioration of the second annular seal.

20. The gate valve of claim 17,
wherein the first fluid bore has a first full-bore inside diameter, the second fluid bore has a second full-bore inside diameter, and the first protective sleeve has a third full-bore inside diameter, the first, second, and third full-bore inside diameters being substantially equal; and
wherein the third fluid bore has a fourth full-bore inside diameter, the fourth fluid bore has a fifth full-bore inside diameter, and the second protective sleeve has a sixth full-bore inside diameter, the fourth, fifth, and sixth full-bore inside diameters being substantially equal.

21. The gate valve of claim 20, wherein the first, second, third, fourth, fifth, and sixth full-bore inside diameters are substantially equal so that, when a fluid flows through the gate valve, the fluid flows through the gate valve via a substantially constant, full-bore diameter across the gate valve.

22. A gate valve, comprising:
a bonnet;
a monolithic valve body to which the bonnet is connected, the monolithic valve body defining first and second external surfaces, the second external surface being perpendicular to the first external surface, the bonnet engaging the first external surface, the monolithic valve body comprising:
a passage formed in the first external surface along a first longitudinal center axis to define a cylindrical internal region in the monolithic valve body, the cylindrical internal region defining a first interior surface in the monolithic valve body, the first interior surface extending circumferentially about the first longitudinal center axis;
a first fluid bore formed in the second external surface along a second longitudinal center axis, the first fluid bore intersecting the cylindrical internal region and defining a second interior surface in the monolithic valve body;
a first annular recess formed in the second interior surface and defining a third interior surface in the monolithic valve body, the third interior surface extending circumferentially about the second longitudinal center axis and adjoining the first interior surface;
a first annular shoulder defined in the monolithic valve body outside of the cylindrical internal region and located between:
the first interior surface defined in the monolithic valve body by the cylindrical internal region; and
the second interior surface defined in the monolithic valve body by the first fluid bore;
and
a second annular shoulder defined in the monolithic valve body outside of the cylindrical internal region and located between:
the first annular shoulder; and
the second interior surface defined in the monolithic valve body by the first fluid bore;
a first monolithic seat element extending within the first annular recess and the cylindrical internal region, the first monolithic seat element comprising a second fluid bore defining a fourth interior surface in the first monolithic seat element;
and
a first protective sleeve extending on opposing sides of the first annular shoulder;
wherein the first monolithic seat element abuts the monolithic valve body;
wherein the first fluid bore of the monolithic valve body has a first full-bore inside diameter, the second fluid bore of the first monolithic seat element has a second full-bore inside diameter, and the first protective sleeve has a third full-bore inside diameter, the first, second, and third full-bore inside diameters being substantially equal;
wherein the first protective sleeve defines an inside circumferentially-extending surface and an outside circumferentially-extending surface radially spaced from the inside circumferentially-extending surface; and
wherein the first protective sleeve is devoid of any openings extending radially therethrough from the outside circumferentially-extending surface to the inside circumferentially-extending surface.

23. The gate valve of claim 22, wherein the first monolithic seat element abuts the first annular shoulder of the monolithic valve body.

24. The gate valve of claim 22,
wherein the monolithic valve body further comprises a second annular recess formed in the second interior surface and adjoining the first annular recess;
wherein the first monolithic seat element further comprises a third annular recess formed in the fourth interior surface; and
wherein the first protective sleeve extends within the second and third annular recesses.

25. The gate valve of claim 22,
wherein the first protective sleeve defines a fifth interior surface;
wherein the second, fourth, and fifth interior surfaces are substantially aligned; and
wherein wear, erosion, and/or complete wash-out of the first protective sleeve is prevented, or at least reduced, as a result of the substantial alignment between the second, fourth, and fifth interior surfaces.

26. The gate valve of claim 22, further comprising:
a first annular seal extending between and engaging the monolithic valve body and the first monolithic seat element;
wherein the first protective sleeve is adapted to protect the first annular seal, reducing the likelihood of blowout, wear-out, and/or deterioration of the first annular seal.

27. The gate valve of claim 22,
wherein the first protective sleeve does not obstruct either the first full-bore inside diameter of the first fluid bore in the monolithic valve body or the second full-bore inside diameter of the second fluid bore in the first monolithic seat element.

28. The gate valve of claim 22,
wherein the monolithic valve body further defines:
a third fluid bore intersecting the cylindrical internal region and defining a fifth interior surface in the monolithic valve body; and
a fourth annular recess formed in the fifth interior surface and defining a third annular shoulder in the monolithic valve body;
wherein the gate valve further comprises:
a second monolithic seat element extending within the fourth annular recess and the cylindrical internal region, the second monolithic seat element comprising a fourth fluid bore defining a sixth interior surface in the second monolithic seat element; and
a second protective sleeve extending on opposing sides of the third annular shoulder
and
wherein the second monolithic seat element abuts the monolithic valve body.

29. The gate valve of claim 28, wherein the second monolithic seat element abuts the third annular shoulder of the monolithic valve body.

30. The gate valve of claim 28,
wherein the monolithic valve body further defines a fifth annular recess formed in the fifth interior surface, the fifth annular recess adjoining the fourth annular recess;
wherein the second monolithic seat element further defines a sixth annular recess formed in the sixth interior surface; and
wherein the second protective sleeve extends within the fifth and sixth annular recesses.

31. The gate valve of claim 28, further comprising:
a first annular seal extending between and engaging the monolithic valve body and the first monolithic seat element; and
a second annular seal extending between and engaging the monolithic valve body and the second monolithic seat element;
wherein the first protective sleeve is adapted to protect the first annular seal, reducing the likelihood of blowout, wear-out, and/or deterioration of the first annular seal; and wherein the second protective sleeve is adapted to protect the second annular seal, reducing the likelihood of blowout, wear-out, and/or deterioration of the second annular seal.

32. The gate valve of claim 31, wherein the first, second, third, fourth, fifth, and sixth full-bore inside diameters are substantially equal so that, when a fluid flows through the gate valve, the fluid flows through the gate valve via a substantially constant, full-bore diameter across the gate valve.

33. The gate valve of claim 28,
wherein the first fluid bore has a first full-bore inside diameter, the second fluid bore has a second full-bore inside diameter, and the first protective sleeve has a third full-bore inside diameter, the first, second, and third full-bore inside diameters being substantially equal; and
wherein the third fluid bore has a fourth full-bore inside diameter, the fourth fluid bore has a fifth full-bore inside diameter, and the second protective sleeve has a sixth full-bore inside diameter, the fourth, fifth, and sixth full-bore inside diameters being substantially equal.

\* \* \* \* \*